United States Patent
Saeki

(10) Patent No.: US 7,633,312 B2
(45) Date of Patent: Dec. 15, 2009

(54) DATA TRANSMISSION APPARATUS AND A DATA RECEIVING APPARATUS USED FOR THE SAME

(75) Inventor: Yutaka Saeki, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 505 days.

(21) Appl. No.: 11/138,476

(22) Filed: May 27, 2005

(65) Prior Publication Data
US 2005/0265526 A1 Dec. 1, 2005

(30) Foreign Application Priority Data

May 28, 2004 (JP) ............................ 2004-158882
Dec. 24, 2004 (JP) ............................ 2004-374772

(51) Int. Cl.
*H03K 19/094* (2006.01)
(52) U.S. Cl. .......................................... 326/83; 326/87
(58) Field of Classification Search ................... 326/30, 326/68, 81–83, 86–87, 90; 375/219, 220; 327/108–109
See application file for complete search history.

(56) References Cited

U.S. PATENT DOCUMENTS

| | | | | |
|---|---|---|---|---|
| 5,519,728 A | * | 5/1996 | Kuo ............................. | 375/257 |
| 5,717,345 A | * | 2/1998 | Yokomizo et al. ............. | 326/80 |
| 6,323,674 B1 | * | 11/2001 | Shrivastava et al. ........... | 326/30 |
| 6,448,813 B2 | * | 9/2002 | Garlepp et al. ................ | 326/83 |
| 6,456,111 B1 | * | 9/2002 | Yamaguchi ................... | 326/86 |
| 6,597,229 B1 | * | 7/2003 | Koyata et al. ................ | 327/333 |
| 6,794,895 B2 | * | 9/2004 | Falconer ...................... | 326/30 |
| 7,176,709 B2 | * | 2/2007 | Uematsu ...................... | 326/30 |
| 2002/0050839 A1 | * | 5/2002 | Yamaguchi ................... | 326/83 |
| 2003/0197528 A1 | * | 10/2003 | Shibata et al. ................ | 326/86 |

FOREIGN PATENT DOCUMENTS

| | | |
|---|---|---|
| JP | 2001-053598 A | 2/2001 |
| JP | 2003-348176 A | 12/2003 |

\* cited by examiner

*Primary Examiner*—Vibol Tan
*Assistant Examiner*—Christopher Lo
(74) *Attorney, Agent, or Firm*—Sughrue Mion, PLLC

(57) ABSTRACT

In data transmission apparatus, a transmission line is connected with a transmitting unit and includes a first transmission line and a second transmission line. A receiving unit is connected with the transmission line. A terminating resistance is connected between a first reception node connected with the first transmission line on a receiving unit side and a second reception node connected with the second transmission line on a receiving unit side. The transmitting unit transmits a transmission data to the receiving unit through the transmission line. The receiving unit detects a reception data corresponding to the transmission data based on an amplitude voltage as a voltage difference between the first reception node and the second reception node.

18 Claims, 22 Drawing Sheets

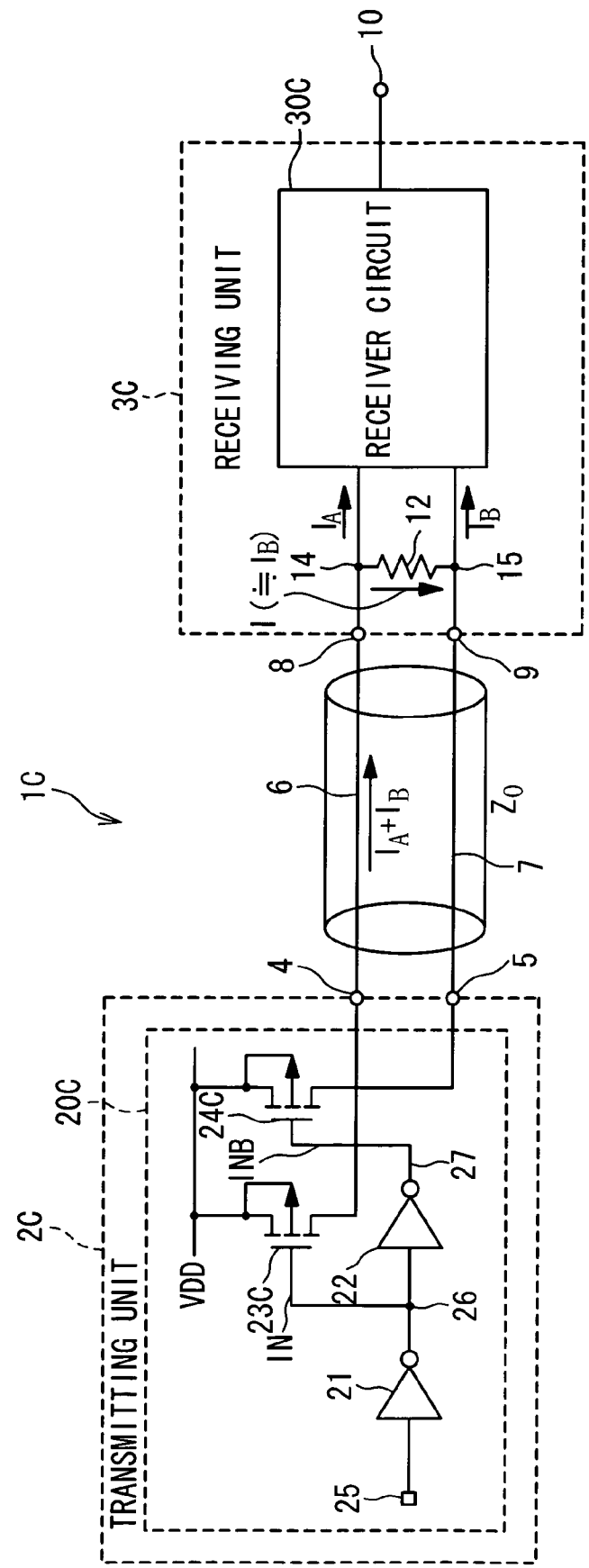

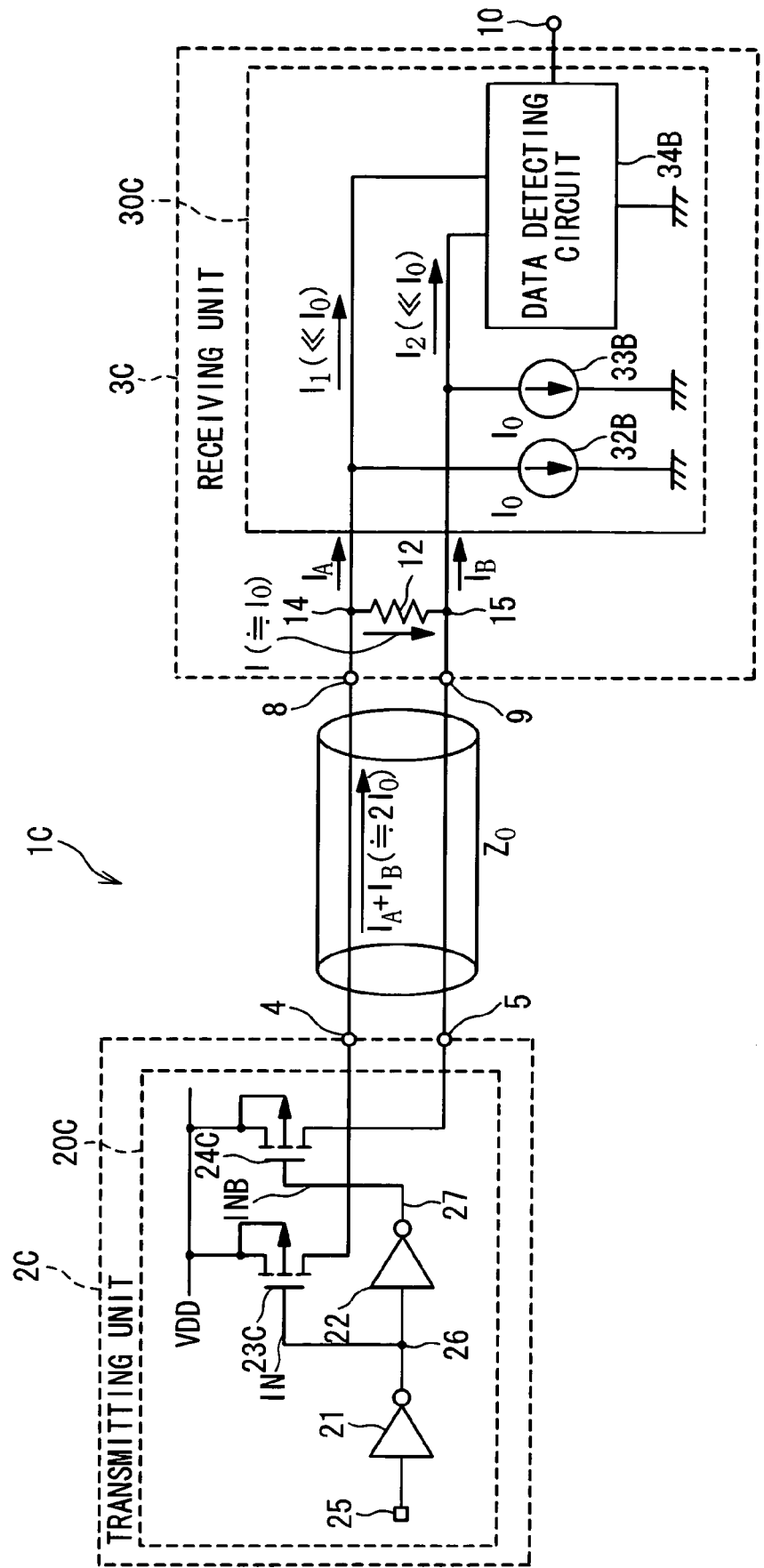

DATA TRANSMISSION APPARATUS AND A DATA RECEIVING APPARATUS USED FOR THE SAME

BACKGROUND OF THE INVENTION

1. Field of the Invention

The present invention relates to a data transmission apparatus and a data receiving apparatus for the same, especially, relates to a technique to transmit data through a transmission line having a pair of transmission line.

2. Description of the Related Art

As a semiconductor technology advances, a data processing apparatus (computer) mounting high density semiconductor integrated circuits with high speed operation is widespread. In such a data processing apparatus, the apparatus is demanded to operate at higher processing speed. Also, a mobile terminal is also widespread, which is configured of high density semiconductor integrated circuits. The semiconductor integrated circuit for the mobile terminal is demanded not only to operate at a high speed but also lower power consumption. In such a semiconductor integrated circuit, various techniques have been proposed to improve a data processing speed. One of the techniques is to speed up a transfer speed of data transmitted and received between the semiconductor integrated circuits.

For instance, an interface circuit is disclosed in Japanese Laid Open Patent Applications (JP-P2001-53598A, and JP-P2003-348176; first and second conventional examples). In the first and second conventional examples, a data outputted from a semiconductor integrated circuit is supplied to another semiconductor integrated circuit through a transmission line. A transmitter circuit is contained in the semiconductor integrated circuit on the data transmission side. A receiver circuit is contained in the semiconductor integrated circuit on the data reception side.

FIG. 1 is a circuit diagram showing a configuration of a receiver circuit described in the above-mentioned first conventional example. As shown in FIG. 1, the receiver circuit 100, which is equivalent to the receiver section 51 in the first conventional example, is configured of a N-channel transistor 101, a N-channel transistor 102, a first receiving section 110, a second receiving section 120, a flip-flop 130, and an inverter 103.

Gates of the N-channel transistor 101 and the N-channel transistor 102 are connected to each other. The N-channel transistor 101 is provided between a node 141 and a ground potential GND. The N-channel transistor 101 is connected with the first receiving section 110 through the node 141. Also, the N-channel transistor 101 is connected with the second receiving section 120 through the node 141. Similarly, the N-channel transistor 102 is provided between a node 142 and the ground potential GND. The N-channel transistor 102 is connected with the first receiving section 110 and the second receiving section 120 through the node 142. The first receiving section 110 includes a first P-channel transistor 111 and a second P-channel transistor 112, a first N-channel transistor 113, and a second N-channel transistor 114. Similarly, the second receiving section 120 includes a third P-channel transistor 121, a fourth P-channel transistor 122, a third N-channel transistor 123, and a N-channel transistor 124. Moreover, the flip-flop 130 includes a first NAND circuit 131 and a second NAND circuit 132. The first NAND circuit 131 and second NAND circuit 132 are connected each other so as to configure the RS latch circuit.

Moreover, a first input terminal 104 and a second input terminal 105 are connected with a transmitter circuit (not shown) through two transmission lines. In addition, a bias terminal 106 is connected to a gate of each of the first N-channel transistor 113, the second N-channel transistor 114, the third N-channel transistor 123, and the fourth N-channel transistor 124. A predetermined voltage is supplied from the bias terminal 106 to each of the gates of the above-mentioned transistors. The transmitter circuit sets the first input terminal 104 or the second input terminal 105 to the ground potential or a state of a high impedance (hereafter, to be referred to as a floating voltage) based on a signal level of a transmission data. When one of the first input terminal 104 and the second input terminal 105 is set to the ground potential, the other terminal is set to the floating voltage.

When the first input terminal 104 is in the ground potential, and the second input terminal 105 is in the floating voltage, the first N-channel transistor 113 and the third N-channel transistor 123 are turned on. Therefore, the node 125 becomes a low level. At this time, the second N-channel transistor 114 and the fourth N-channel transistor 125 are turned off. Therefore, a node 115 becomes a high level. Also, when the first input terminal 104 is in the floating voltage, and the second input terminal 105 is in the ground potential, the first N-channel transistor 113 and the third N-channel transistor 123 are turned off. Therefore, the node 125 becomes the high level. At this time, the second N-channel transistor 114 and the fourth N-channel transistor 125 are turned on. Therefore, the node 115 becomes the low level. The flip-flop 130 stores an output signal based on the levels of the nodes 115 and 125, and outputs the stored signal from the output terminal 107 through the inverter 103.

The first N-channel transistor 113 and the third N-channel transistor 123 or the second N-channel transistor 114 and the fourth N-channel transistor 124 supply electric current to the N-channel transistor 101 or the N-channel transistor 102 even if the first input terminal 104 or the second input terminal 105 is set to the floating voltage. For this reason, the first input terminal 104 or the second input terminal 105 is set to the potential of 50 to 200 mV even in a floating state. A voltage at this time is an amplitude voltage on the transmission line. In this case, the electric current flowing to the first N-channel transistor 113 and the third N-channel transistor 123 or the second N-channel transistor 114 and the fourth N-channel transistor 124 depends on gate-source voltages of the first N-channel transistor 113 and the third N-channel transistor 123 or the second N-channel transistor 114 and the fourth N-channel transistor 124 (hereinafter, to be referred to as a voltage GS113, a voltage GS114, a voltage GS123, and a voltage GS124, respectively).

In a word, the electric current flowing to the first N-channel transistor 113 and the third N-channel transistor 123 or the second N-channel transistor 114 and the fourth N-channel transistor 124 depends on the deference between the potential of the first input terminal 104 or the second input terminal 105 and the potential of the bias terminal 106. This is similar even when the first input terminal 104 or the second input terminal 105 is set to the ground potential. The amplitude voltages of the first input terminal 104 and the second input terminal 105 in the receiver circuit 100 depend on a resistance of the N-channel transistor 101, a resistance of the N-channel transistor 102, and a resistance from an output transistor of the transmitter circuit to the first input terminal 104 or the second input terminal 105.

For instance, it is supposed that a resistance from the output transistor of the transmitter circuit to the first input terminal 104 (or the second input terminal 105) is 200Ω. Also, it is supposed that a current value flowing from the second input terminal 105 to the transmitter circuit in response to the signal from the transmitter circuit is 200 μA. In this case, the second input terminal 105 has a voltage in a floating state higher by 40 mV (=200Ω*200 μA) than the ground potential. The voltage of the second input terminal 105 when the transistor is turned off is determined based on the electric resistance of the N-channel transistor 102 and the electric current flowing to the N-channel transistor 102 in the receiver circuit 100 shown in FIG. 1. Therefore, the amplitude voltage at the second input terminal 105 is changed depending on the resistances of the N-channel transistor 101 and N-channel transistor 102, and the resistance from the transistor of the transmitter circuit to the first input terminal 104 (or the second input terminal 105).

Even if the first input terminal 104 (or the second input terminal 105) is set to the ground potential, the voltage at the first input terminal 104 (or the second input terminal 105) is higher by a slight voltage than the ground potential due to the ON resistance of the transistor of the transmitter circuit, the impedance of the transmission line, and the like (hereinafter, this voltage is referred to as a floating voltage). Thus, the voltages GS113 to GS124 are influenced by the deviation of the floating voltage. For this reason, the power consumption of the receiver circuit 100 results in being changed.

Further, the voltage difference of the first input terminal 104 (or the second input terminal 105), as the amplitude voltage of the transmission line, is changed due to the floating voltage. The change of power consumption is a problem to a mobile terminal in which low power consumption is essentially required. Also, the change of the amplitude voltage on the transmission line causes instability in the high speed transmitting operation. Moreover, if the ground potential in the transmitter circuit rises higher than the ground potential of the receiver circuit for some reasons, the amplitude voltage on the transmission line becomes small. For this reason, some measure might be occasionally needed, such as widening the gate width of the transistor of the transmitter circuit. In this case, it is necessary to enlarge the layout area, which restricts the high density integration. Moreover, it is not preferable that the ON resistance results in being lowered extremely for the impedance matching with the transmission line.

FIG. 2 is a circuit diagram showing a configuration of the transmitter circuit shown in the above-mentioned second conventional example. As shown in FIG. 2, a transmitter circuit 200 (equivalent to a transmitter 41 in the above-mentioned second conventional example) includes an inverter 201, an inverter 202, a first N-channel transistor 203, a second N-channel transistor 204, and a third N-channel transistor 205. In the transmitter circuit 200, a complementary signal output is connected through the third N-channel transistor 203. The third N-channel transistor 205 is turned on when the signal is transmitted, and is turned off when the signal is not transmitted. In this way, the amplitude voltage of the complementary signal is made small, and a delay is shortened when the signal is transmitted from the transmitter circuit to the receiver circuit.

In the high-speed transmission line shown in FIG. 2, transistors are connected between the complementary signal outputs on the transmitter circuit side. As shown in FIG. 2, in the transmitter circuit 200, the third N-channel transistor 205 is added to the transmitter circuit. It is preferable that the configuration of the transmitter circuit is simple. However, the configuration of the transmitter circuit 200 makes the simplification difficult. Moreover, the receiver circuit and the transmitter circuit are independent products respectively. Therefore, considering that some modification may be required on the transmitter circuit, it is desirable that the configuration has flexibility for the modification.

SUMMARY OF THE INVENTION

In an aspect of the present invention, a data transmission apparatus includes a transmitting unit; a transmission line connected with the transmitting unit and including a first transmission line and a second transmission line; a receiving unit connected with the transmission line; and a terminating resistance connected between a first reception node connected with the first transmission line on a receiving unit side and a second reception node connected with the second transmission line on a receiving unit side. The transmitting unit transmits a transmission data to the receiving unit through the transmission line. The receiving unit detects a reception data corresponding to the transmission data based on an amplitude voltage as a voltage difference between the first reception node and the second reception node.

Here, a resistance value of the terminating resistance is preferably coincident with a differential impedance of the transmission line.

Also, the data transmission apparatus may further include a third resistance; and a capacitance. When the terminating resistance includes a first resistance having one end connected with the first reception node and the other end connected with a connection node; and a second resistance having one end connected with the second reception node and the other end connected with the connection node, the third resistance and the capacitance may be connected in series between the connection node and the ground terminal.

Also, the transmitting unit may include a first switch connected between the first transmission line and a ground terminal; and a second switch connected between the second transmission line and the ground terminal. It is preferable that the transmission apparatus exclusively turns on one of the first switch and the second switch in response to the transmission data, and an electric current flows from the receiving unit to the turned-on switch through the transmission line. Instead, the transmitting unit may include a third switch connected between the first transmission line and a power supply terminal; and a fourth switch connected between the second transmission line and the power supply terminal. At this time, it is preferable that the transmission apparatus exclusively turns on one of the first switch and the second switch in response to the transmission data, and an electric current flows from the turned-on switch to the receiving unit through the transmission line.

Also, the first switch may include a first MOS transistor which has an on resistance coincident with a characteristic impedance of the transmission line, and the second switch may include a second MOS transistor which has an on resistance coincident with a characteristic impedance of the transmission line.

Also, the receiving unit may include a receiver circuit configured to detect the reception data in response to the amplitude voltage.

Also, the receiving unit may include a receiver circuit configured to supply a first electric current to the first reception node and a second electric current to the second reception node, to detect the reception data in response to the amplitude voltage, and to output the detected reception data. In this case, the receiver circuit may include a constant current source configured to supply a first constant current to the first reception node and a second constant current to the second reception node; and a data detecting circuit configured to supply a first sub-electric current to the first reception node and a second sub-electric current to the second reception node, and to generate the reception data in response to the amplitude voltage. The first electric current is a summation of the first constant current and the first sub-electric current and the second electric current is a summation of the second constant current and the second sub-electric current. In this case, the constant current source may include a first constant current source configured to supply the first constant current to the first reception node based on a bias; and a second constant current source configured to supply the second constant current to the second reception node based on the bias. Also, the data detecting circuit may supply the first sub-electric current to the first reception node depending on the second constant current and the second sub-electric current to the second reception node depending on the first constant current, and may output the reception data corresponding to the transmission data in response to the amplitude voltage.

Also, the receiving unit may include a receiver circuit configured to draw out a first electric current from the first reception node and a second electric current from the second reception node, to detect the reception data in response to the amplitude voltage, and to output the detected reception data. In this case, the receiver circuit may include a constant current source configured to draw out a first constant current from the first reception node and a second constant current from the second reception node; and a data detecting circuit configured to draw out a first sub-electric current from the first reception node and a second sub-electric current from the second reception node, and to generate the reception data in response to the amplitude voltage. The first electric current is a summation of the first constant current and the first sub-electric current and the second electric current is a summation of the second constant current and the second sub-electric current.

Also, the constant current source may include a first constant current source configured to draw out the first constant current from the first reception node based on a bias; and a second constant current source configured to draw out the second constant current from the second reception node based on the bias. In this case, the data detecting circuit may draw out the first sub-electric current from the first reception node depending on the second constant current and the second sub-electric current from the second reception node depending on the first constant current, and may output the reception data corresponding to the transmission data in response to the amplitude voltage.

Also, it is preferable that the second constant current having a same magnitude as that of the first constant current. Also, the first sub-electric current and the second sub-electric current are smaller than the first constant current and the second constant current, respectively.

Also, the data detecting circuit may include a first detecting circuit connected with the first transmission line and the second transmission line, and configured to detect the amplitude voltage, and to generate a first output signal based on the amplitude voltage; a second detecting circuit connected with the first transmission line and the second transmission line, and configured to detect the amplitude voltage and to generate a second output signal based on the amplitude voltage; and an output circuit configured to output the reception data in response to at least one of the first and second output signals. The output circuit may include a flip-flop circuit.

Also, each of the first and second constant current sources may include a plurality of P-channel transistors connected with the data detecting circuit. Two of the plurality of P-channel transistors may have gates connected with each other and connected with the bias. At this time, the size ratio of the first P channel transistor and the second P channel transistor is preferably n:m (n and m are optional natural numbers). Also, each of the first and second constant current sources may include a plurality of P-channel transistors connected with the data detecting circuit. Two of the plurality of P-channel transistors have gates connected with each other and another of the plurality of P-channel transistors has a gate connected with the bias. The size ratio of the three P channel transistors is preferably n:m:l (n, m and l are optional natural numbers).

Also, another aspect of the present invention, a data transmission apparatus includes the transmission line used in the above data transmission apparatus; a first transmitting/receiving apparatus connected with the transmission line; a second transmitting/receiving apparatus connected with the transmission line; a first terminating resistance connected between a first node as the first reception node connected with the first transmission line on a side of the second transmitting/receiving apparatus side and a second node as the second reception node connected with the second transmission line on the side of the second transmitting/receiving apparatus side; and a second terminating resistance connected between a third node as the first reception node connected with the first transmission line on a side of the first transmitting/receiving apparatus side and a fourth node as the second reception node connected with the second transmission line on the side of the first transmitting/receiving apparatus side. The first transmitting/receiving apparatus may include a first transmitting unit as the transmitting unit used in the above data transmission apparatus; and a first receiving unit as the receiving unit used in the above data transmission apparatus. The second transmitting/receiving apparatus may include a second transmitting unit as the transmitting unit used in the above data transmission apparatus; and a second receiving unit as the receiving unit used in the above data transmission apparatus.

In another aspect of the present invention, a receiving unit is a unit which is used in the above data transmission apparatus.

BRIEF DESCRIPTION OF THE DRAWINGS

FIG. 4 is a diagram showing a current flow when a transistor 23 is turned on;

FIG. 5 is a diagram showing a current flow when a transistor 24 is turned on;

FIG. 22 is a circuit diagram showing a configuration of the data transmission apparatus according to a tenth embodiment of the present invention;

FIG. 23 is a circuit diagram showing a configuration of the receiver circuit according to an eleventh embodiment of the present invention.

DESCRIPTION OF THE PREFERRED EMBODIMENTS

Hereinafter, a data transmission apparatus of the present invention will be described in detail with reference to the attached drawings. A data transmission apparatus 1 to be described below includes a transmitting unit 2 on a data transmitting side and a receiving unit 3 on a data receiving side in order to facilitate the understanding of the present invention. However, it should be noted that the data communication of the data transmission apparatus 1 is not limited to one-way communication.

Figure 3:
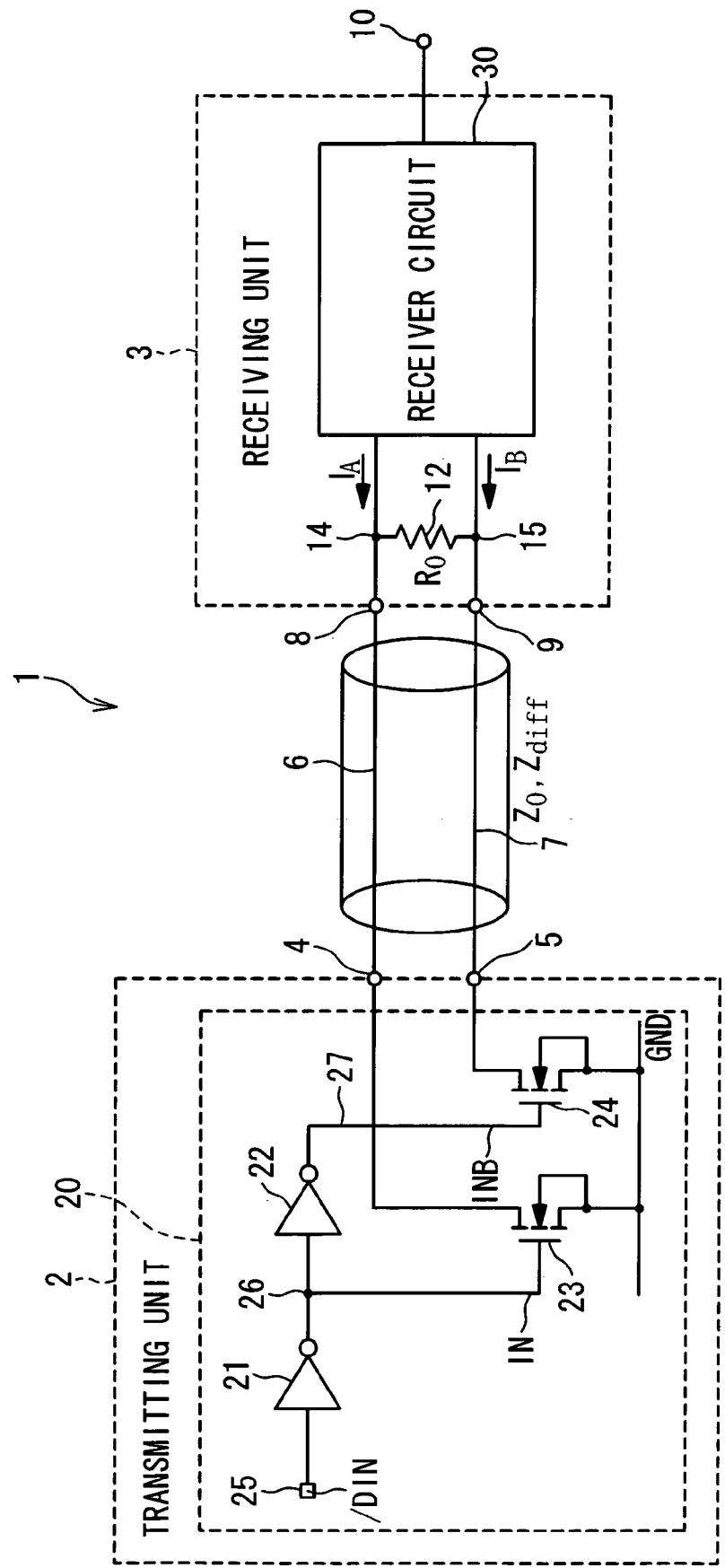
FIG. 3 is a block diagram showing a configuration of a data transmission apparatus according to the present invention.

FIG. 3 is a block diagram showing a configuration of the data transmission apparatus 1 according to the present invention. As shown in FIG. 3, the data transmission apparatus 1 includes the transmitting unit 2, the receiving unit 3, and a first transmission line 6 and a second transmission line 7. The first transmission line 6 and the second transmission line 7 are provided between the transmitting unit 2 and the receiving unit 3. The transmitting unit 2 includes a transmitter circuit 20, a first output terminal 4, and a second output terminal 5. The transmitter circuit 20 generates an output signal corresponding to a transmission data. The output signal generated in the transmitter circuit 20 is outputted from the first output terminal 4 and the second output terminal 5 to the receiving unit 3 through the first transmission line 6 and the second transmission line 7.

In more detail, the transmitter circuit 20 includes a data input terminal 25, a first inverter 21, a second inverter 22, a first output transistor 23, and a second output transistor 24. The data input terminal 25 receives a transmission data signal /DIN corresponding to the transmission data. The first inverter 21 inverts the transmission data signal /DIN supplied from the data input terminal 25 to generate a signal IN. The second inverter 22 inverts the signal IN supplied from the first inverter 21 through a node 26, to generate a signal INB. The first output transistor 23 and the second output transistor 24 are MOS transistors, whose sources are connected with a ground potential GND. The first output transistor 23 functions as a switch element to connect the first output terminal 4 with the ground potential GND in response to the signal IN. The second output transistor 24 functions as a switch element to connect the second output terminal 5 with the ground potential GND in response to the signal INB. A gate of the first output transistor 23 is connected with the node 26. The signal IN is supplied from the first inverter 21 to the gate of the first output transistor 23. A drain of the first output transistor 23 is connected with the first output terminal 4. The first output transistor 23 flows electric current supplied from the first output terminal 4 to the ground potential GND in response to the signal IN outputted from the first inverter 21. Similarly, a gate of the second output transistor 24 is connected with the output of the second inverter 22. The signal INB is supplied from the second inverter 22 to the gate of the second output transistor 24 through a node 27. A drain of the second output transistor 24 is connected with the second output terminal 5. The second output transistor 24 flows electric current from the second output terminal 5 to the ground potential GND in response to the signal INB outputted from the second inverter 22.

The receiving unit 3 includes a terminating resistance 12, a receiver circuit 30, a first input terminal 8, and a second input terminal 9.

The terminating resistance 12 is provided between a node 14 connected with the first input terminal 8 and a node connected with the second input terminal 9. The terminating resistance 12 has a resistance R by which a desirable amplitude voltage can be supplied in response to the electric current flowing between the node 14 and the node 15.

Figure 4:
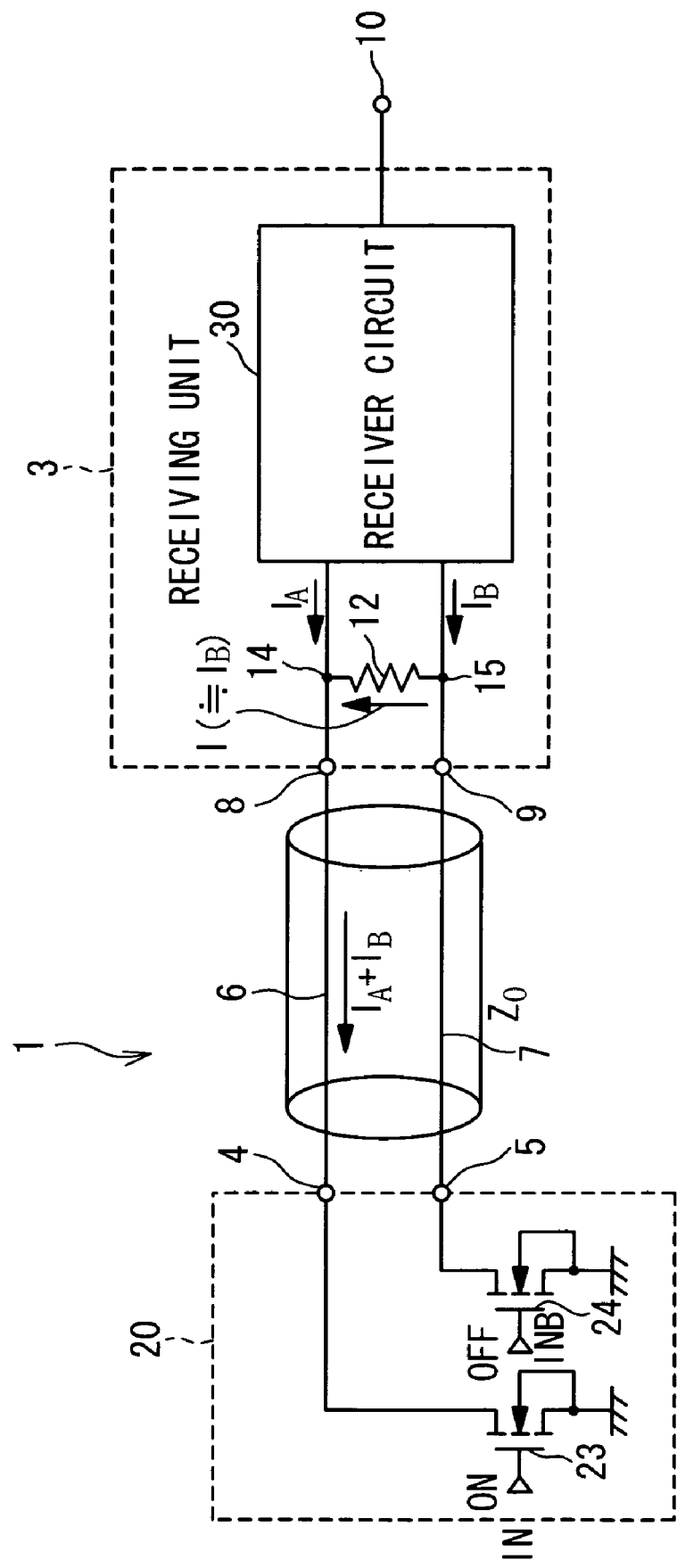
Figure 5:
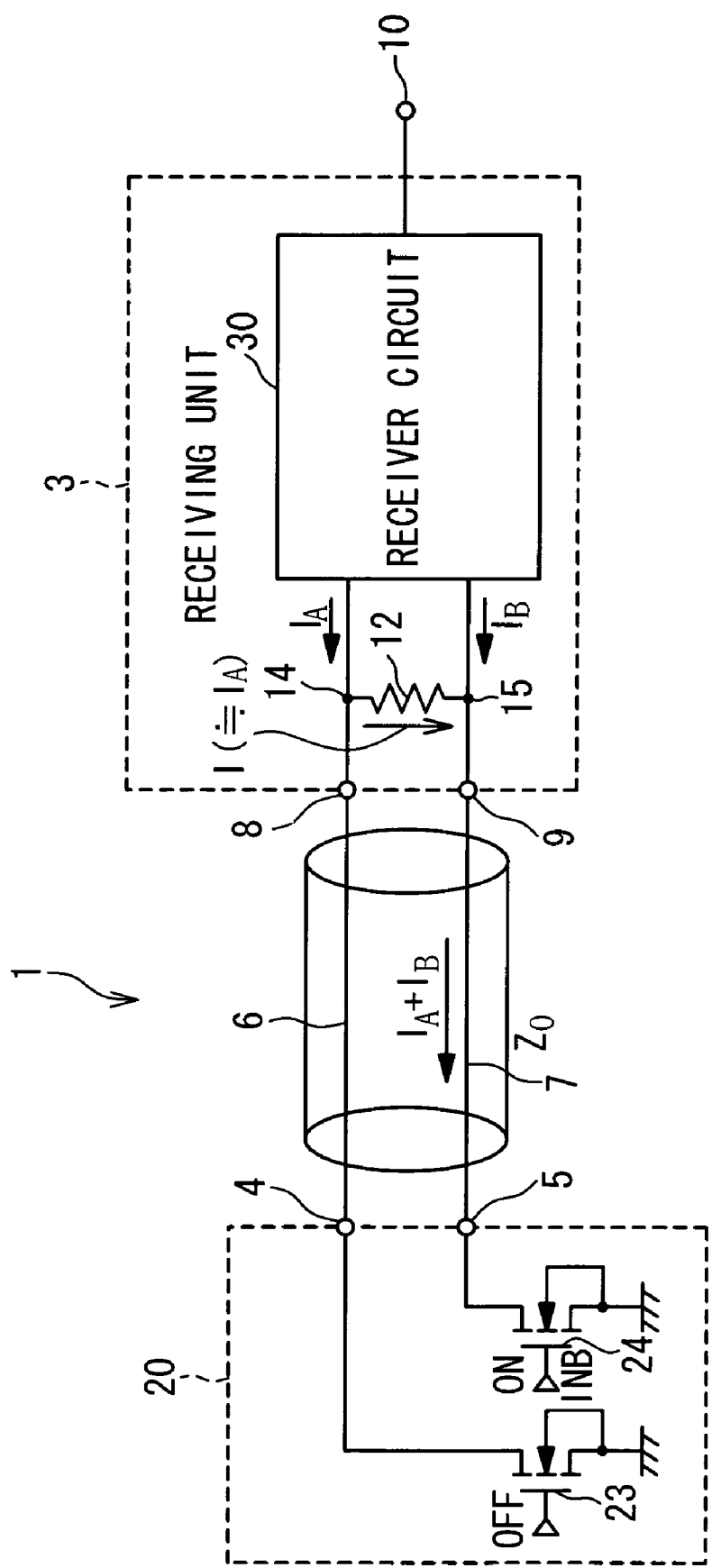

The receiver circuit 30 generates a reception data. The receiver circuit 30 has two functions. One of the functions is to supply electric currents IA and IB to the nodes 14 and 15 for data transmission and reception. Here, the routes of the electric currents IA and IB supplied to the nodes 14 and 15 are depended on which of the transistors in the transmitter circuit 20, i.e., which of the first output transistor 23 and the second output transistor 24 is turned on. As shown in FIG. 4, when the first output transistor 23 is turned on and the second output transistor 24 is turned off, the electric current IB supplied to the node 15 flows into the node 14 through the terminating resistance 12. The electric current IA and the electric current IB are added together in the node 14. The electric current IA+IB flows into the ground potential GND of the transmitter circuit 20 through the first transmission line 6 and the first output transistor 23. On the other hand, as shown in FIG. 5, when the first output transistor 23 is turned off and the second output transistor 24 is turned on, the electric current IA flows into the node 15 through the terminating resistance 12. The electric current IA and the electric current IB are added together on the node 15. The resultant electric current IA+IB flows into the ground potential GND of the transmitter circuit 20 through the second transmission line and the second output transistor 24.

The other function of the receiver circuit 30 is to determine a data transmitted from the transmitting unit 2 as a transmission data based on a voltage generated across the terminating resistance 12 (that is, based on a voltage between the node 14 and the node 15). As mentioned above, the electric current flows through the terminating resistance 12 in the different directions, depending on which of the first output transistor 23 and the second output transistor 24 is turned on (that is, depending on data to be transmitted). Therefore, the voltage difference corresponding to the transmission data is generated between the node 14 and the node 15 connected through the terminating resistance 12. The receiver circuit 30 determines the transmission data based on the voltage difference, and outputs the determined data as the reception data.

The advantage of the data transmission apparatus 1 having such a configuration is in that the voltage signal used for determining the transmission data by the receiver circuit 30 (that is, the voltage generated across the terminating resistance 12) is based on the resistance value R0 of the terminating resistance 12 and the electric current I flowing through the terminating resistance 12. An amplitude of the voltage signal generated across the terminating resistance 12 does not depend on an ON resistance value of each of the first output transistor 23 and the second output transistor 24, and impedance of each of the first transmission line 6 and the second transmission line 7. This means that power consumption of the receiving unit 3 does not change depending on a change of the floating voltage. As described above, it is important to a mobile terminal in which low power consumption is indispensability essential. Additionally, the amplitude of the voltage signal generated across the terminating resistance 12 does not depend on the ON resistance value of each of the first output transistor 23 and the second output transistor 24, and the impedance of each of the first transmission line 6 and the second transmission line 7. Therefore, the deviation of these elements does not influence the amplitude of the voltage signal generated across the terminating resistance 12. This improves the stability of transmission data at high speed.

In order to further stabilize the amplitude of the voltage signal generating across the terminating resistance 12, it is preferable that the magnitude of the electric current IA supplied to the node 14 and the magnitude of the electric current IB supplied to the node 15 are equal to each other when the node 14 is grounded (through the first transmission line 6 and the first output transistor 23) and when the node 15 is grounded (through the second transmission line 7 and the second output transistor 24). According to such configuration, the amplitude of the voltage signal generating across the terminating resistance 12 can be stabilized regardless of which of the first output transistor 23 and the second output transistor 24 is turned on.

Figure 6:
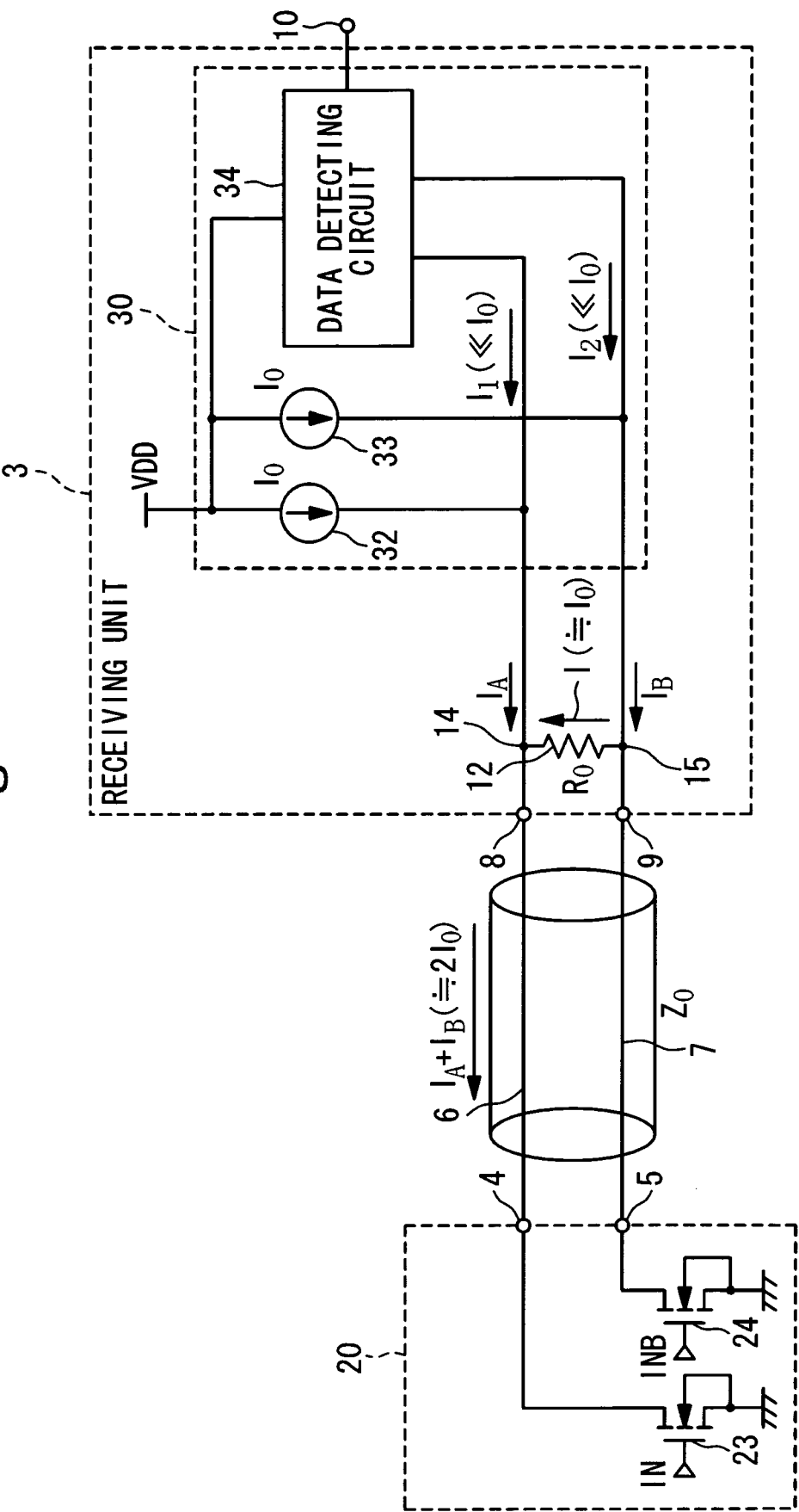
FIG. 6 is a circuit diagram showing a configuration of a receiver circuit according to the present invention.
Figure 7:
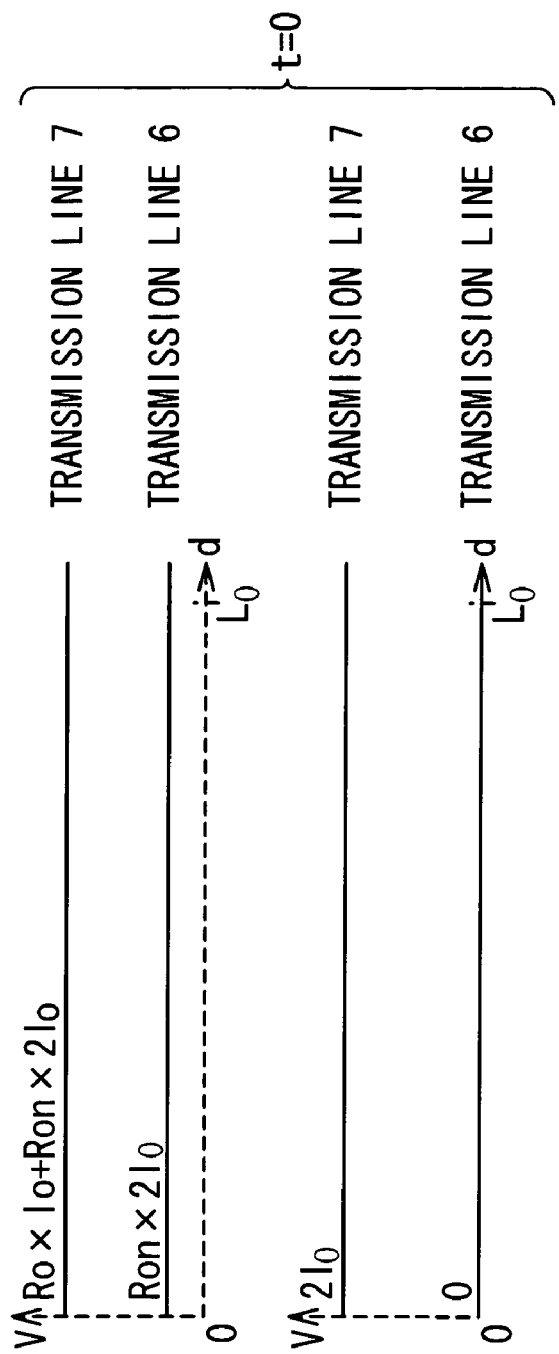
FIGS. 7A and 7B, 8A and 8B, 9A and 9B and 10A and 10B are diagrams showing signals on transmission lines.
Figure 8:
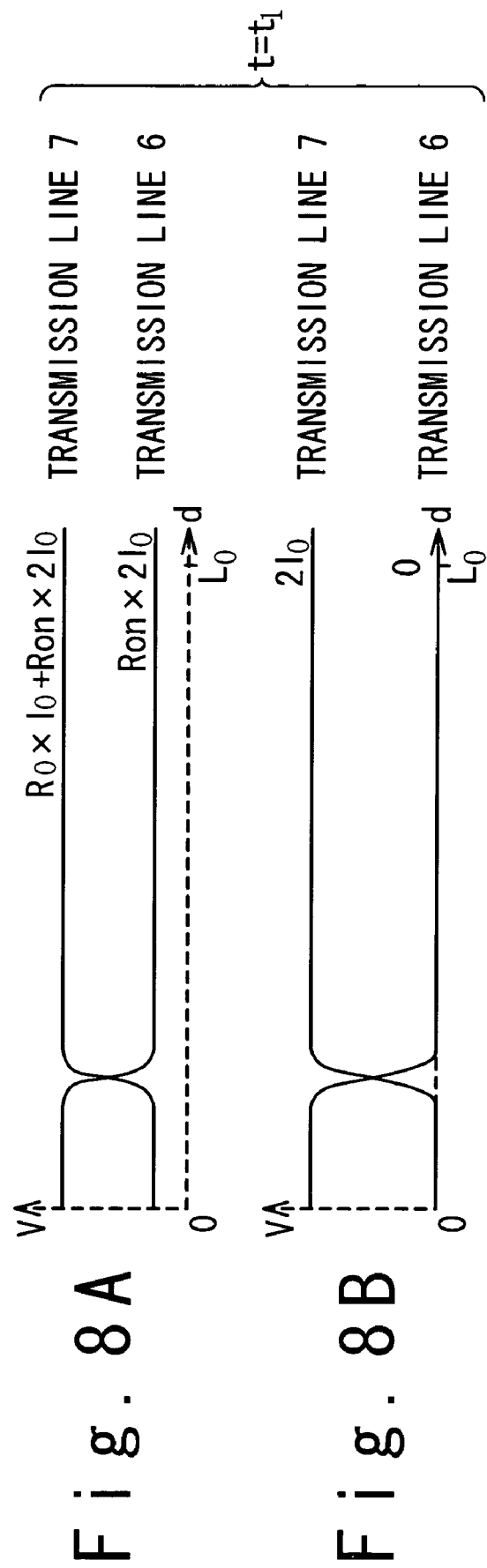
Figure 9:
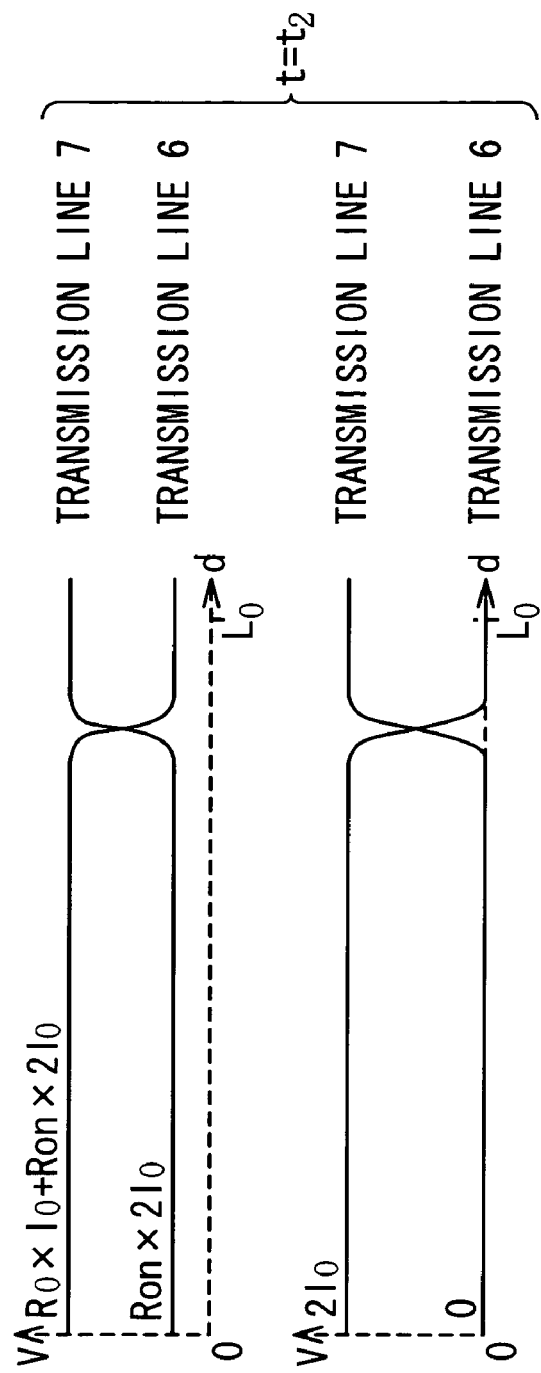
Figure 10:
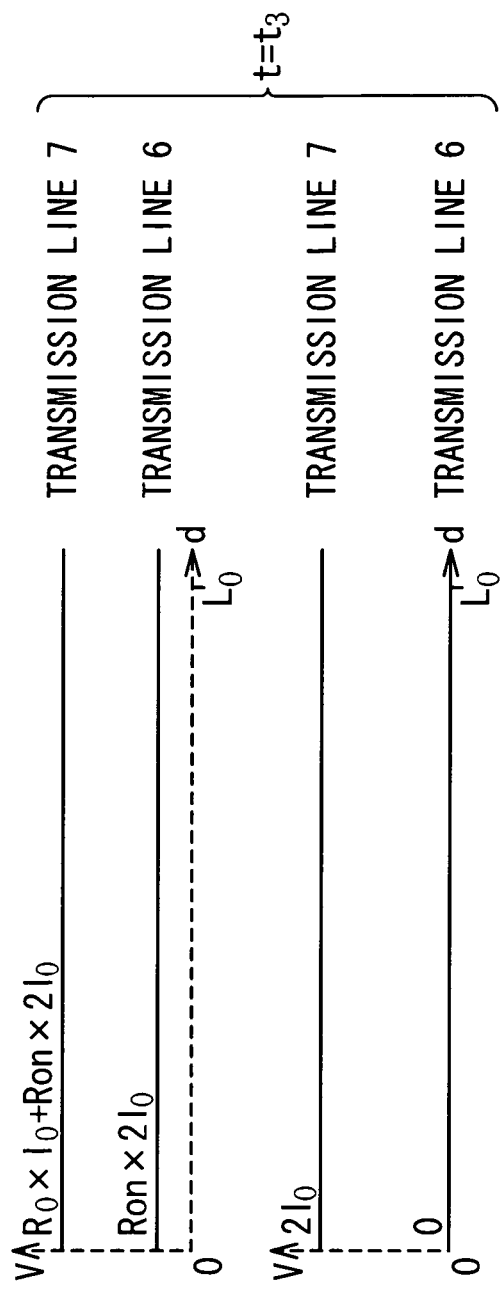

FIG. 6 is a circuit diagram showing a configuration of the receiver circuit 30 according to the present invention, which is suitable for stabilization of the amplitude of the voltage signal generated across the terminating resistance 12. In the second embodiment, the receiver circuit 30 includes a constant current source 32, a constant current source 33, and a data detecting circuit 34. The constant current sources 32 and 33 supply constant electric current I0 to the nodes 14 and 15, respectively. The data detecting circuit 34 determines the transmission data based on the voltage signal generated across the terminating resistance 12 (that is, a voltage difference signal between the node 14 and the node 15) and outputs the determined data as the reception data. The electric currents I1 and I2 respectively supplied to the nodes 14 and 15 from the data detecting circuit 34 are as small as negligible, compared with the constant electric currents I0 generated by the constant current sources 32 and 33. As a result, the magnitude of the electric current I flowing through the terminating resistance 12 is approximately the same as the constant electric current I0 regardless of which of the first output transistor 23 and the second output transistor 24 is turned on. Therefore, the amplitude of the voltage signal generated across the terminating resistance 12 becomes approximately constant to R0I0. This is advantageous to transmit the data at high speed.

Figure 1:
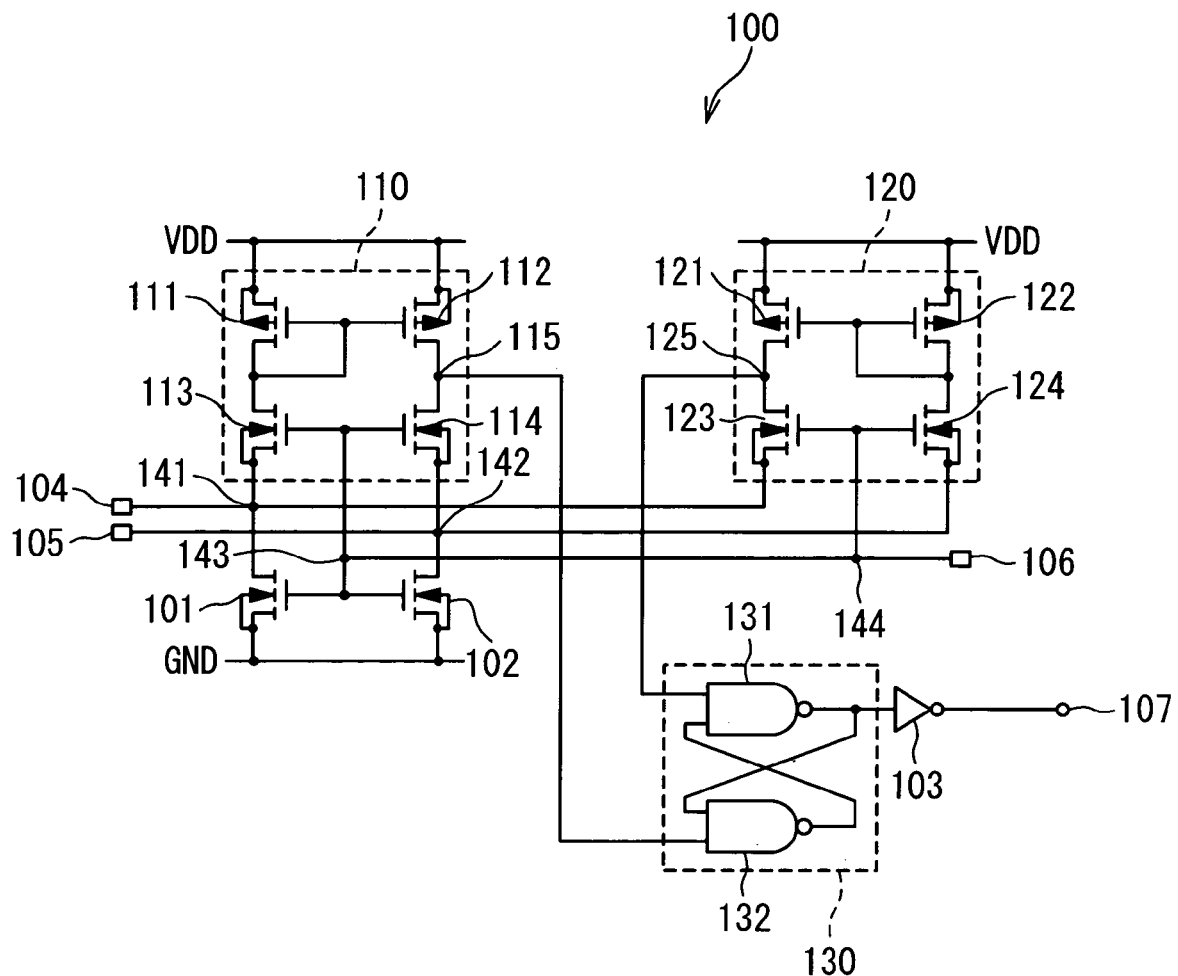
FIG. 1 is a circuit diagram showing a configuration of a receiver circuit described in a first conventional example.
Figure 2:
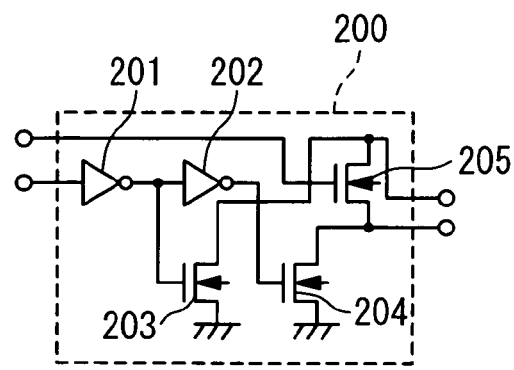
FIG. 2 is a circuit diagram showing a configuration of a transmitter circuit shown in a second conventional example.

Another advantage when the receiver circuit 30 is configured as shown in FIG. 6 is in that it is possible to supply the whole electric current flowing in the receiver circuit 30 to the transmitter circuit 20. In such configuration, electric current consumed only in the receiver circuit 30 can be reduced, unlike the conventional receiver circuit 100 shown in FIG. 1. Therefore, the power consumption of the data transmission apparatus 1 can be effectively reduced.

It is ideal that the magnitudes of the electric current I1 and I2 are adjusted to be zero in order to reduce the current consumption. However, even when the magnitudes of the electric currents I1 and I2 are not zero, it is preferable that the magnitude of the electric current I2 supplied to the node 14 when the node 14 is grounded (through the first transmission line 6 and the first output transistor 23) is same as that of the electric current I1 supplied to the node 15 when the node 15 is grounded (through the second transmission line 7 and the second output transistor 24). In this configuration, the amplitude of the voltage signal generated across the terminating resistance 12 becomes constant regardless of which of the first output transistor 23 and the second output transistor 24 is turned on.

One problem that might be caused in the data transmission apparatus 1 with the configuration shown in FIG. 3 (or FIG. 6) is that a signal transmitted from the transmitter circuit 20 to the receiver circuit 30 through the first transmission line 6 and the second transmission line 7 is reflected on the side of the receiver circuit 30. For instance, in the transmission apparatus 1 with the configuration shown in FIG. 6, when the signal IN is in a high level and the signal INB is in a low level in an initial state (t<0), the signals IN and INB are inverted at the time t=0, as shown in FIGS. 7A to 10B.

Initially, both of the constant electric currents I0 generated by the constant current sources 32 and 33 flow to the first output transistor 23 through the first transmission line 6. Therefore, as shown in FIGS. 7A and 7B, initially, the voltage of the first transmission line 6 is equal to RON*2I0 over the whole. The voltage of the second transmission line 7 is equal to R0*I0+RON*2I0 over the whole. Here, the RON is an ON resistance value of the first output transistor 23 or the second output transistor 24. The voltage difference between the first transmission line 6 and the second transmission line 7 is −R0*0. In FIGS. 7A and 7B (and FIGS. 8A and 8B to 10A and 10B), it should be noted that d=0 is the positions of the first output terminal 4 and the second output terminal 5 in the transmitting unit 2, and d=L0 is the positions of the first input terminal 8 and the second input terminal 9 in the receiving unit 3. When the signals IN and INB are inverted in the time t=0, the first output transistor 23 is turned off and the second output transistor 24 is turned on. Thus, the voltages and the electric currents on the first transmission line 6 and the second transmission line 7 start to be inverted at the end on the side of the transmitter circuit 20 (that is, the first output terminal 4 and the second output terminal 5). In other words, as shown in FIGS. 9A and 9B, and 10A and 10B, the voltage wave and current wave travel from the transmitter circuit 20 toward the receiver circuit 30. The reflected voltage wave and current wave function as noise to the signals transmitted on the first transmission line 6 and the second transmission line 7. Therefore, it is not preferable that the voltage wave and current wave travel toward the receiver circuit 30 and are reflected by the receiver circuit 30.

Figure 11:
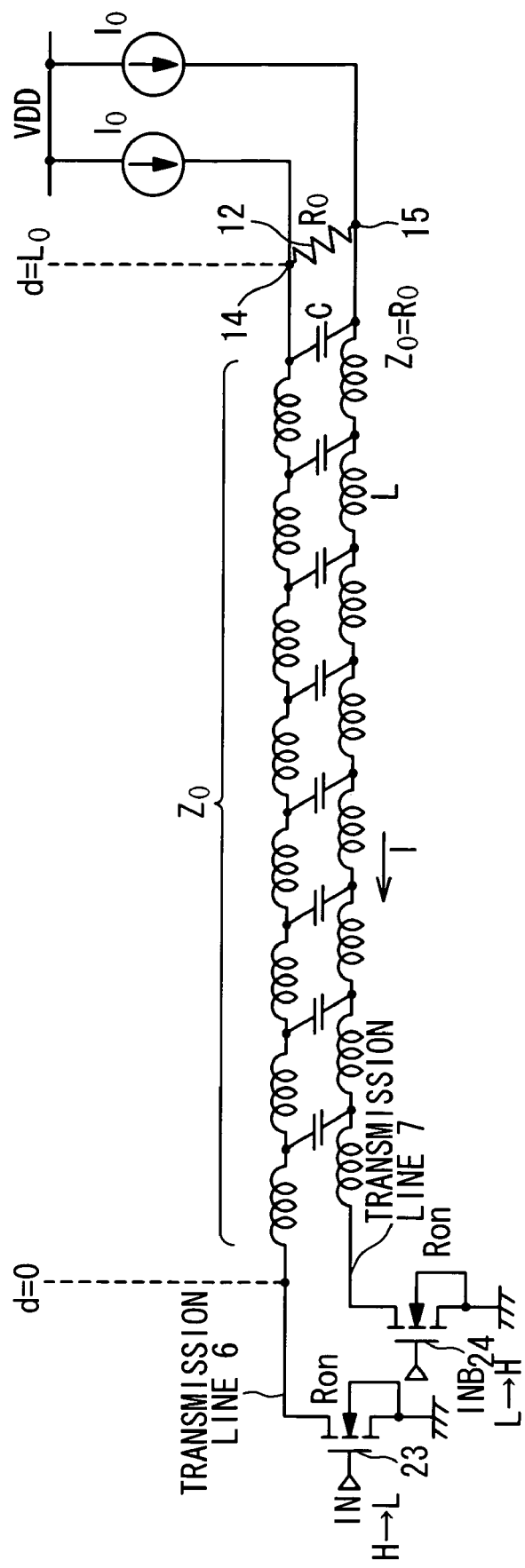
FIG. 11 is circuit diagram showing a transmission line and a terminating resistance in the present invention.

In order to restrain the reflection of the voltage wave and the current wave, it is preferable that a transmission line of the first transmission line 6 and the second transmission line 7 matches in impedance to the terminating resistance 12, as shown in FIG. 11. More specifically, the resistance value R0 of the terminating resistance 12 is preferably a same as differential impedance Zdiff of the transmission path of the first transmission line 6 and the second transmission line 7. Through impedance matching, the reflection of the voltage wave and the current wave can be restrained, and noise to the signals on the transmission lines can be also restrained.

In order to further restrict the influence by the reflection of the voltage wave and the current wave, it is preferable to restrict the reflection not only on the side of the receiver circuit 30 but also on the side of the transmitter circuit 20. This can be achieved by matching the impedance of the transmitter circuit 20 with common impedance of the transmission path of the first transmission line 6 and the second transmission line 7. For this purpose, the on-resistances of the first output transistor 23 and the second output transistor 24 in the transmitter circuit 20 are made equal to the impedance Z0 of the transmission path of the first transmission line 6 and the second transmission line 7. In this way, the reflection on the side of the transmitter circuit 20 can be restricted, and the noise of the signal to be transmitted on the transmission path can be also restricted in one layer.

Hereinafter, a specific configuration of the receiving unit 3 shown in FIGS. 3 and 6 will be described in detail.

First Embodiment

Figure 12:
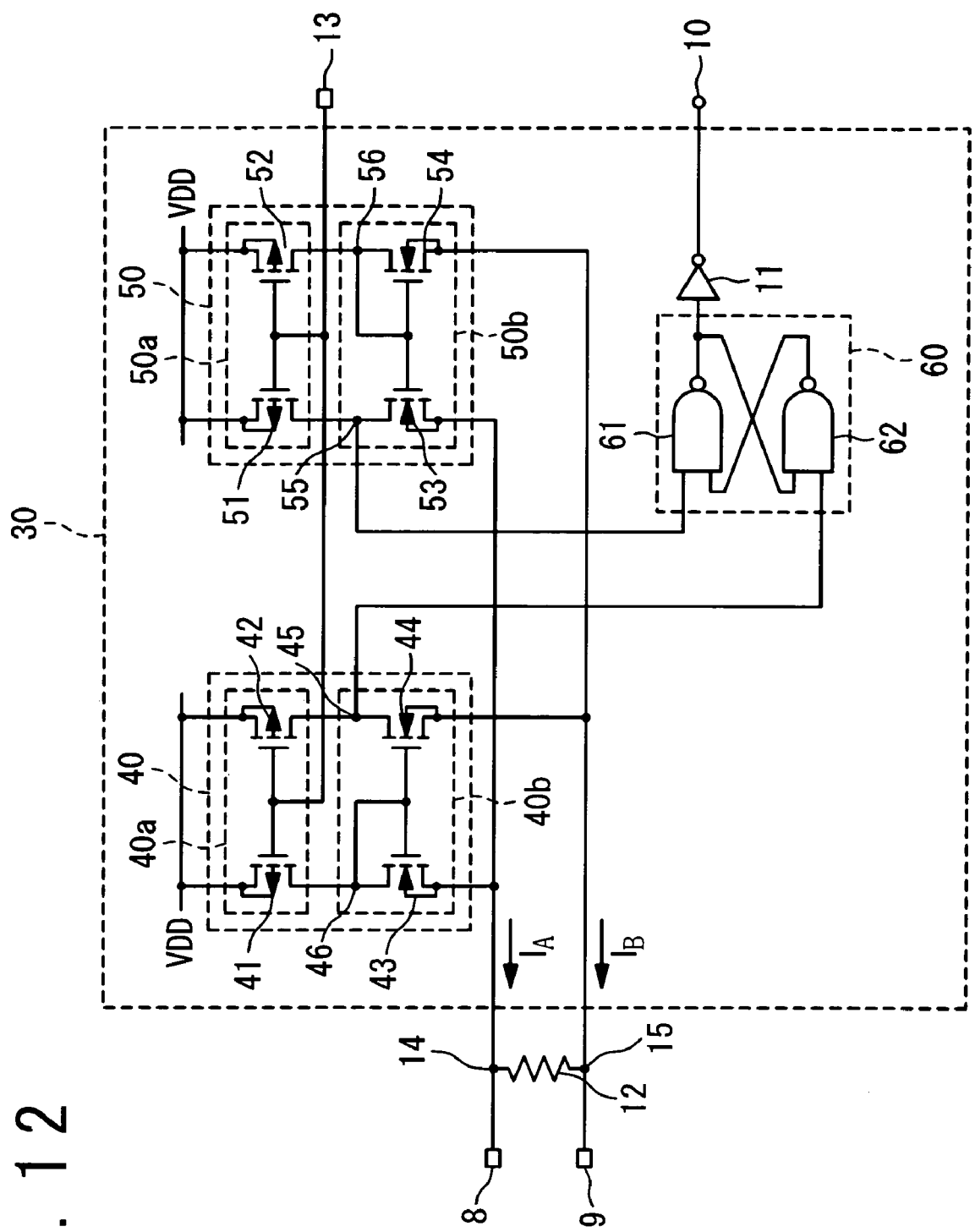
FIG. 12 is circuit diagram showing a configuration of a receiving unit according to a first embodiment of the present invention.

FIG. 12 is circuit diagram showing a configuration of the receiving unit 3 according to the first embodiment of the present invention. The receiving unit 3 in the first embodiment has a configuration corresponding to the configuration shown in FIG. 3. More specifically, the receiver circuit 30 in the receiving unit 3 includes a first receiver circuit 40, a second receiver circuit 50, a flip-flop 60, and an inverter 11. Moreover, the receiver circuit 30 includes a bias supply terminal 13 to supply a bias to the first receiver circuit 40 and the second receiver circuit 50, and an output terminal 10 to output an output signal corresponding to reception data.

The first receiver circuit 40 generates a first output signal in response to a signal received through the first input terminal 8 and the second input terminal 9. The first receiver circuit 40 includes a first constant current source 40a and a first detecting circuit 40b. The first output signal generated in the first receiver circuit 40 is supplied from a node 45 to the flip-flop 60. The second receiver circuit 50 is a same in the circuit configuration as the first receiver circuit 40. That is, the second receiver circuit 50 is composed of a second constant current source 50a and a second detecting circuit 50b. The second receiver circuit 50 generates a second output signal in response to a signal received through the first input terminal 8 and the second input terminal 9. The second output signal generated in the second receiver circuit 50 is supplied from a node 55 to the flip-flop 60. The flip-flop 60 carries out a waveform shaping operation and outputs each signal in response to the above-mentioned first output signal and second output signal. The inverter 11 inverts and outputs the output signal outputted from the flip-flop 60. The terminating resistance 12 is a resistance element provided between the node 14 and the node 15. The terminating resistance 12 has a resistance R by which the desirable amplitude voltage can be supplied in response to the electric current flowing between the node 14 and the node 15.

The first receiver circuit 40 is composed of a first P-channel MOS transistor 41, a second P-channel MOS transistor 42, a first N-channel MOS transistor 43, and a second N-channel MOS 44. The respective sources of the first P-channel MOS transistor 41 and the second P-channel MOS transistor 42 are connected with a power line VDD. Moreover, gates of the first P-channel MOS transistor 41 and the second P-channel MOS transistor 42 are mutually connected. A bias supplied from the bias supply terminal 13 is supplied to each gate. The first N-channel MOS transistor 43 is provided between the first P-channel MOS transistor 41 and the node 14. The Second N-channel MOS transistor 44 is provided between the second P-channel MOS transistor 42 and the node 15. Gates of the first N-channel MOS transistor 43 and the second N-channel MOS transistor 44 are mutually connected. In addition, the gate of the first N-channel MOS transistor 43 is short-circuited with a drain of the first N-channel MOS transistor 43 through the node 46.

The second receiver circuit 50 has the same configuration as the first receiver circuit 40. The second receiver circuit 50 is composed of a third P-channel MOS transistor 51, a forth P-channel MOS transistor 52, a third N-channel MOS transistor 53, and a forth N-channel MOS 54. Sources of the third P-channel MOS transistor 51 and the forth P-channel MOS transistor 52 are connected with the power line VDD. Moreover, gates of the third P-channel MOS transistor 51 and the forth P-channel MOS transistor 52 are connected mutually. A bias is supplied from the bias supply terminal 13 to each gate. The third N-channel MOS transistor 53 is provided between the third P-channel MOS transistor 51 and the node 14. The forth N-channel MOS transistor 54 is provided between the forth P-channel MOS transistor 52 and the node 15. Gates of the third N-channel MOS transistor 53 and the forth N-channel MOS transistor 54 are connected mutually. In addition, the gate of the forth N-channel MOS transistor 54 is short-circuited with a drain of the third N-channel MOS transistor 53 through the node 56.

Figure 13:
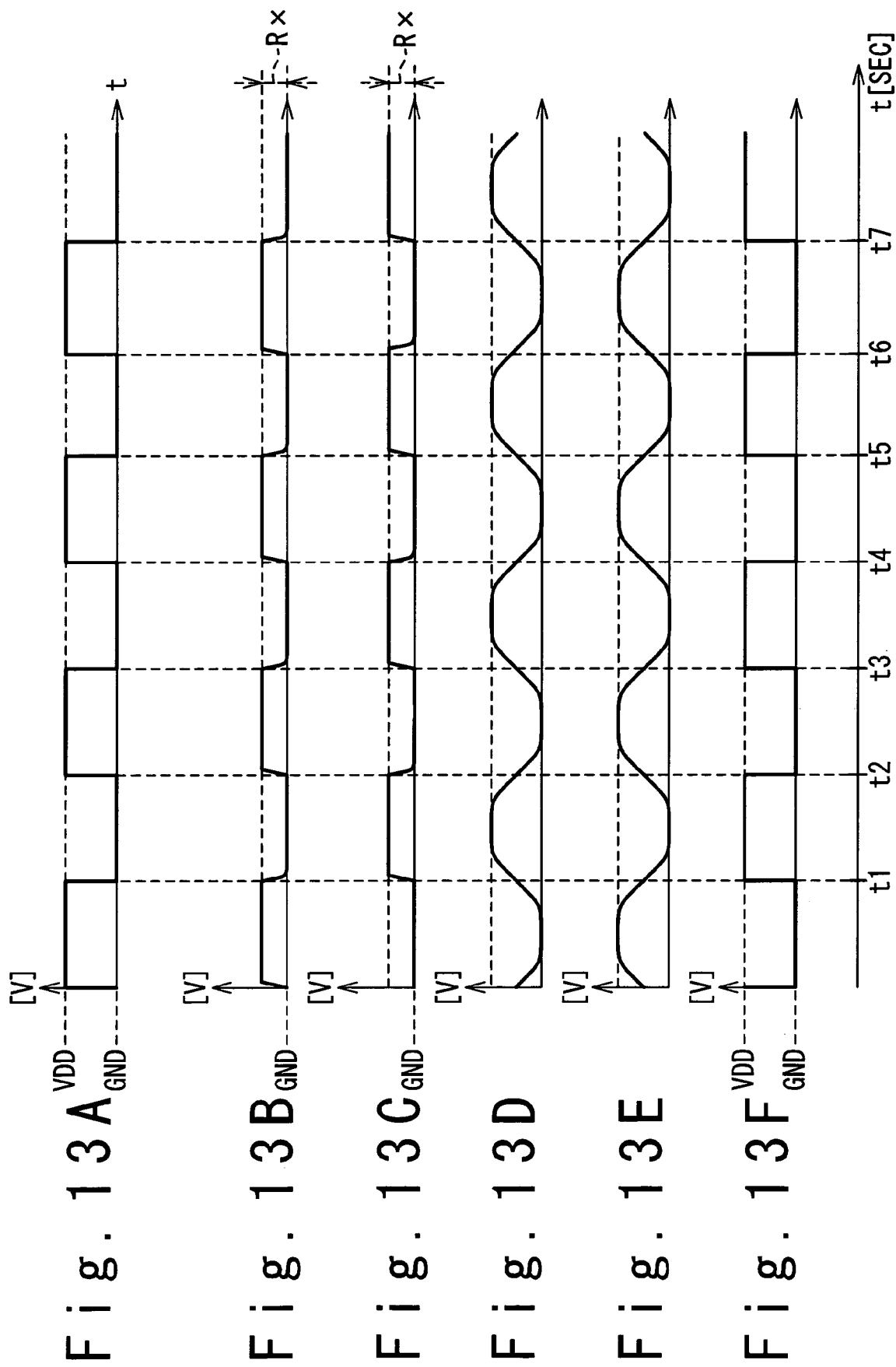
FIGS. 13A to 13F are timing charts showing an operation of the receiver circuit in the first embodiment.

Next, referring to FIG. 13, an operation of the receiver circuit 30 will be described. In the following description, the voltage between the gate and the source in first N-channel MOS transistor 43 is expressed as a voltage GS43 and the voltage between the gate and the source in the second N-channel MOS transistor 44 is expressed as a voltage GS44. Similarly, a voltage between the gate and the source in the third N-channel MOS transistor 53 is expressed as a voltage GS53, and a voltage between the gate and the source in the fourth N-channel MOS transistor 54 is expressed as the voltage GS54. Moreover, the following description is based on a case that the node 14 becomes floating voltage and the node 15 becomes ground potential. However, the operation is a same as an operation when the node 14 is in the ground potential and the node 15 is in the floating voltage.

As shown in FIG. 12, the first P-channel MOS transistor 41 and the second P-channel MOS transistor 42 configure a current mirror constant current source. Therefore, the first P-channel MOS transistor 41 and the second P-channel MOS transistor 42 supplies electric current of a same value to each of the nodes. At this time, if the voltage GS43 and the voltage GS44 are equivalent to each other, the voltage of the node 45 and the voltage of the node 46 become equal to each other. In addition, if the voltage GS53 and the voltage GS54 are equal to each other, the voltage of the node 55 and the voltage of the node 56 become equal to each other.

Here, when the node 14 becomes the floating voltage, and the node 15 becomes the ground potential, the voltage difference between the node 46 and the node 14 (the voltage GS43) becomes smaller than the voltage difference between the node 46 and the node 15 (the voltage GS44). Similarly, the voltage difference between the node 56 and the node 14 (the voltage GS53) becomes smaller than the voltage difference between the node 56 and the node 15 (the voltage GS53). In other words:

the node 14=floating voltage, the node 15=the ground potential the voltage GS43<the voltage GS44 (1)

the voltage GS53<the voltage GS54 (2).

At this time, comparing the voltage of the node 45 with the voltage of the node 46, the voltage of the node 45 becomes lower than the voltage of the node 46 since the voltage GS43<the voltage GS44.

Also, comparing the voltage of the node 55 with the voltage of the node 56, the voltage of the node 55 becomes higher than the voltage of the node 56 since the voltage GS53<voltage GS54.

The voltage change of the node 45 results from amplification of the voltage change of the voltage GS44. Similarly, the voltage change of the node 55 results from amplification of the voltage change of the voltage GS53. Therefore, if the voltages of the GS44 and GS53 are higher than a predetermined voltage, the voltage changes of the node 45 and the node 55 are almost in a full range between the power supply voltage and the ground voltage. For instance, it is supposed that the electric current flowing through the terminating resistance 12 is electric current I, and the amplitude voltage is 50 mV, the voltage GS44−the voltage GS43=the voltage GS54−the voltage GS53=50 mV.

FIGS. 13A to 13F are timing charts showing of the operation of the receiver circuit 30 when an input signal Vin is supplied to the above-mentioned data input terminal 25 of the transmitter circuit 20. In FIGS. 13A to 13F, a vertical axis indicates voltage, and a horizontal axis indicates the time. FIG. 13A shows the input signal Vin supplied to the data input terminal 25. FIG. 13B shows the voltage change of the node 14. FIG. 13C shows the voltage change of the node 15. FIG. 13D shows the voltage change of the node 45. FIG. 13E shows the voltage change of the node 55. FIG. 13F shows the voltage change of the output terminal 10. As shown in FIGS. 13A to 13F, the amplitude voltages of the nodes 14 and 15 of in the receiver circuit 30 are determined based on the resistance R of the terminating resistance 12 and the electric current I flowing through the terminating resistance 12.

For example, it is supposed that the resistance from the second output transistor 24 to the second input terminal 9 is 100Ω, and the resistance from the first output transistor 23 to the first input terminal 8 is 100Ω. At this time, when the second output transistor 24 is turned on and the first output transistor 23 is turned off, the voltage of the node 15 becomes the value of 100 mV (=100Ω*1 mA) from the ground potential, on the condition that the current value flowing from the second input terminal 9 to the second output transistor 24 is 1 mA. In this case, since the node 14 and the node 15 are terminated by the terminating resistance 12 (=100Ω), the voltage of the node 15 becomes 150 mV (=100Ω*0.5 mA+100 mV), when the electric current flowing from the node 14 to the node 15 through the terminating resistance 12 is 0.5 mA.

Similarly, when the first output transistor 23 is turned on and the second output transistor 24 is turned off, the current value flowing from the second input terminal 9 to the second output transistor 24 becomes 1 mA. Therefore, the voltage of the node 15 becomes the value of 100 mV (=100Ω*1 mA) from the ground potential. Thus, the amplitude voltage of the node 15 becomes 50 mV (=150 mV−100 mV). This value is determined based on the resistance of the terminating resistance 12 and the current value I flowing to the terminating resistance 12.

By configuring the receiver circuit 30 as mentioned above, the circuit is realized, in which the amplitude voltage of the node 15 does not depend on the ground potential GND of the transmitter circuit 20, the on-resistance of the first output transistor 23, the on-resistance of the second output transistor 24, and the resistance of the transmission line.

Moreover, the electric current I flowing through the terminating resistance 12 is determined by the current mirror source current of PMOS transistors 41, 42, 51 and 52 of the receiver circuit 30. Therefore, deviation of power consumption can be decreased. In addition, the influence impedance of transmission line and a parasitic element, and a protection network, and an influence of noise superimposed on the transmission line can be reduced to be minimum by adjusting the terminating resistance 12 to a lower resistance. Furthermore, impedance matching can be attained easily through the adjustment of the terminating resistance 12.

It should be noted that in the above-mentioned description, the size of the first P-channel MOS transistor 41 of the first receiver circuit 40 is equal to that of the second P-channel MOS transistor 42. However, the size ratio of the first P-channel MOS transistor 41 and the second P-channel MOS transistor 42 is possible to be m:1 (m is larger number than one). Similarly, the size ratio of the third P-channel MOS transistor 51 and the fourth P-channel MOS transistor 52 is possible to be m:1. When the size ratio of first P-channel MOS transistor 41 and the second P-channel MOS transistor 42 is m:1, it is effective to set the size ratio of the first N-channel MOS transistor 43 and the second N-channel MOS transistor 44 to m:1. Similarly, when the ratio of the sizes of the third P-channel MOS transistor 51 and the fourth P-channel MOS transistor 52 is m:1, it is effective to set the size ratio of the third N-channel MOS transistor 53 and the fourth N-channel MOS transistor 54 to m:1.

In the above-mentioned receiver circuit 30, when the node 14 becomes floating voltage, and the node 15 becomes the ground potential, the electric current I flows from the node 14 to the node 15 through the terminating resistance 12, and the amplitude voltages of the nodes 14 and 15 are secured. At this time, the electric current flowing from the second P-channel MOS transistor 42 to the node 15 is necessary for the voltage change of the node 45. Moreover, the electric current flowing from the third P-channel MOS transistor 51 to the node 15 is necessary for the voltage change of the node 55. That is to say, these electric currents are not used for the voltage change of the transmission line with a large load capacity. Since the node 45 and node 55 do not have so large load as the transmission line, the circuit can operate appropriately even if the electric currents flowing through the second P-channel MOS transistor 42 and the third P-channel MOS transistor 51 are reduced. Therefore, by providing the size ratio of the P-channel MOS transistor 41 and the second P-channel MOS transistor 42 and the size ratio of the third P-channel MOS transistor 51 and the fourth P-channel MOS transistor 52 are set to m:1 in the current mirror circuits of the receiver circuit 30 shown in FIG. 6, it is possible to reduce the electric currents that flows to the node 45, the second P-channel MOS transistor 42, and the third P-channel MOS transistor 51. In addition, the power consumption of the receiver circuit can be decreased.

Second Embodiment

Figure 14:
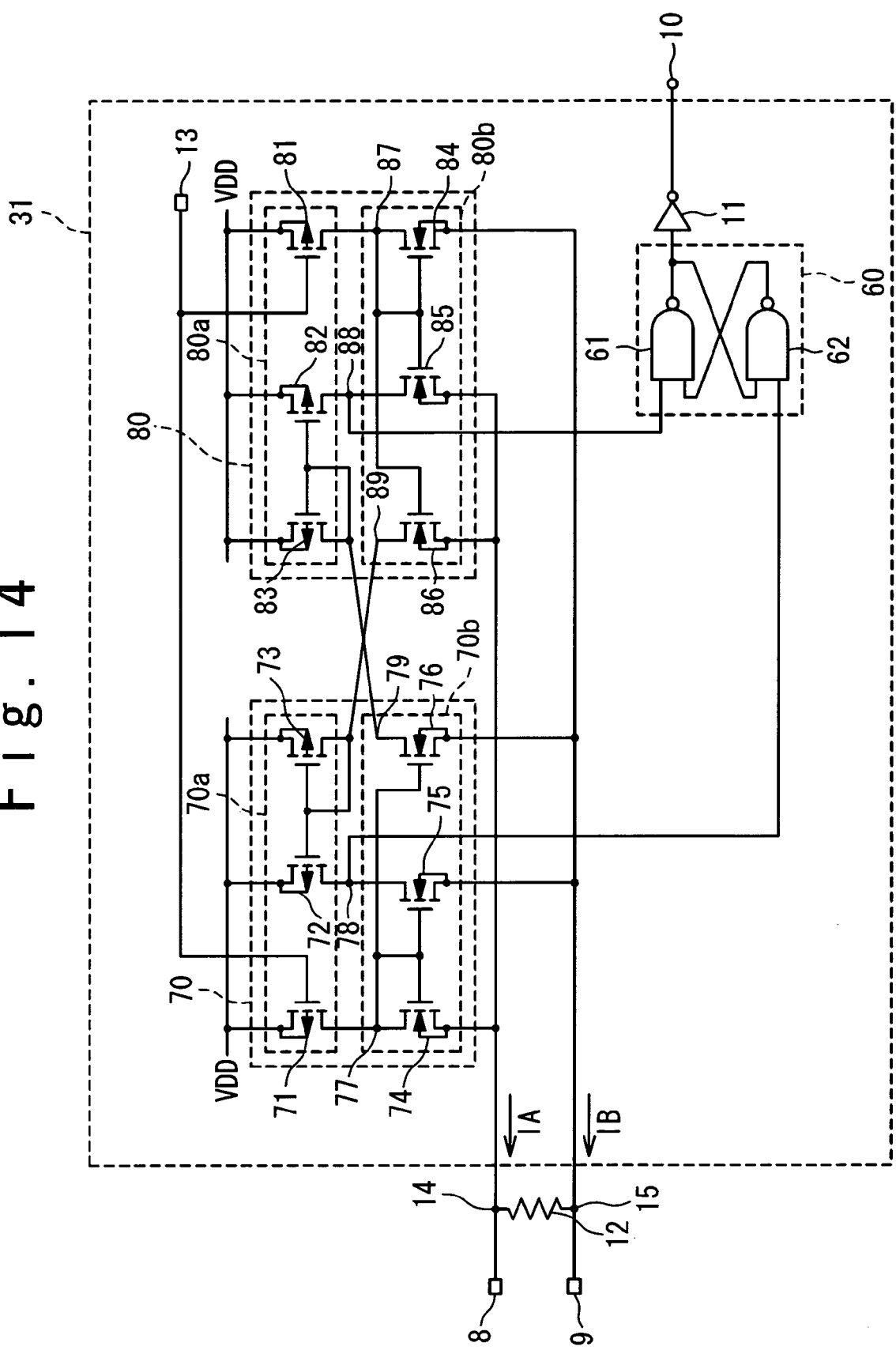
FIG. 14 is a circuit diagram showing a configuration of the receiver circuit according to a second embodiment of the present invention.

FIG. 14 is a circuit diagram of a configuration of the receiver circuit 3 according to the second embodiment of the present invention. In the following description, same signs are given to the same or corresponding elements in the first embodiment. The description of the same components as in the first embodiment is omitted in the second embodiment.

As shown in FIG. 14, the receiver circuit 3 in the second embodiment has the configuration corresponding to FIG. 3 as well as the first embodiment. However, in the second embodiment, the receiver circuit 31 is used, which is different from the receiver circuit 30 in FIG. 12. Specifically, the receiver circuit 31 includes a first receiver circuit 70, a second receiver circuit 80, a flip-flop 60, and an inverter 11. Moreover, the receiver circuit 31 includes a bias supply terminal 13 to supply the bias to the first receiver circuit 70 and the second receiver circuit 80, and an output terminal 10 to output the output signal corresponding to the reception data.

The first receiver circuit 70 includes a first constant current source 70a of the first to third P-channel MOS transistors 71-73, and a first detecting circuit 70b of the first to third N-channel MOS transistors 74-76. A source of the first P-channel MOS transistor 71 is connected with the power supply line VDD and the gate thereof is connected with the bias supply terminal 13. The respective sources of the second P-channel MOS transistor 72 and the third P-channel MOS transistor 73 are connected with the power supply line VDD. In addition, a gate of the second P-channel MOS transistor 72 and a gate of the third P-channel MOS transistor 73 are mutually connected. Moreover, a gate of the third P-channel MOS transistor 73 is connected to the drain thereof. The first N-channel MOS transistor 74 is provided between the first P-channel MOS transistor 71 and the node 14. The source of the first N-channel MOS transistor 74 is connected with the node 14. Similarly, the second N-channel MOS transistor 75 is provided between the second P-channel MOS transistor 72 and the node 15. The source of the second N-channel MOS transistor 75 is connected with the node 15. The gate of the first N-channel MOS transistor 74 and the gate of second N-channel MOS transistor 75 are mutually connected and are connected with the gate of the third N-channel MOS transistor 76. The third N-channel MOS transistor 76 is provided between a node 77 and the node 15, and the source is connected with the node 15.

The second receiver circuit 80 has the same configuration as the first receiver circuit 70. The second receiver circuit 80 is composed of a second constant current source 80a of the forth to sixth P-channel MOS transistors 81-83 and a second detecting circuit 80b of the forth to sixth N-channel MOS transistors 84-86. A source of the fourth P-channel MOS transistor 81 is connected with the power supply line VDD, and the gate thereof is connected with the bias supply terminal 13. The respective sources of the fifth P-channel MOS transistor 82 and the sixth P-channel MOS transistor 83 are connected with the power supply line VDD. In addition, the gate of the fifth P-channel MOS transistor 82 and the gate of the sixth P-channel MOS transistor 83 are mutually connected. Moreover, the gate of the sixth P-channel MOS transistor 83 is connected to the drain thereof. The fourth N-channel MOS transistor 84 is provided between the fourth P-channel MOS transistor 81 and the node 15. The source of the fourth N-channel MOS transistor 84 is connected with the node 15. Similarly, the fifth N-channel MOS transistor 85 is provided between the fifth P-channel MOS transistor 82 and the node 14. The source of the fifth N-channel MOS transistor 85 is connected with the node 14. The gate of the fourth N-channel MOS transistor 84 and the gate of the fifth N-channel MOS transistor 85 are mutually connected, and are connected with the gate of the sixth N-channel MOS transistor 86. The sixth N-channel MOS transistor 86 is supplied between a node 89 and the node 14 and the source is connected with the node 14.

As shown in FIG. 14, the drain of the third P-channel MOS transistor 73 and the drain of the sixth N-channel MOS transistor 86 are mutually connected through the node 89. Similarly, the drain of the sixth P-channel MOS transistor 83 and the drain of the third N-channel MOS transistor 76 are mutually connected through a node 79. The output signal generated in the second receiver circuit 80 is supplied to a first NAND circuit 61 through a node 88. The output signal generated in the first receiver circuit 70 is supplied to a second NAND circuit 62 through a node 78.

Next, referring to FIG. 14, an operation of the receiver circuit 31 will be described. The following description is based on the condition that the voltage between the gate and the source of the first N-channel MOS transistor 74 is the voltage GS74, the voltage between the gate and the source of the second N-channel MOS transistor 75 is the voltage GS75, the voltage between the gate and the source of the third N-channel MOS transistor 76 is the voltage GS76, and the voltage between the gate and the source of the fourth N-channel MOS transistor 84 is the voltage GS584, and furthermore, the voltage between the gate and the source of the fifth N-channel MOS transistor 85 is the voltage GS8, and the voltage between the gate and the source of the fifth N-channel MOS transistor 86 is the voltage GS86. Moreover, the following description is given for a case that the node 14 becomes floating voltage the node 15 becomes ground potential. However, the same operation is carried out when the node 14 is the ground potential and the node 15 is the floating voltage.

As shown in FIG. 14, the first to third P-channel MOS transistors 71 to 73 configure a current mirror constant current source. Therefore, if the voltages GS74, GS75 and GS76 are equal to each other, the voltages of the nodes 77, 78 and 79 become equal to each other. In addition, if the voltages GS84, GS85, and GS86 are equal to each other, the voltages of the nodes 87, 88, and 89 become equal to each other.

Here, when the node 14 becomes the floating voltage, and the node 15 becomes the ground potential, the voltage difference between the node 77 and the node 14, i.e., the voltages GS74 becomes smaller than the voltage difference between the node 77 and the node 15, i.e., the voltage GS75 or GS76. Similarly, the voltage difference between the node 87 and the node 14, i.e., the voltage GS86 or GS85 becomes smaller than the voltage difference between the node 87 and the node 15, i.e., the voltage GS84. In other words, when the node 14=the floating voltage, and the node 15=the ground potential voltage, the voltage GS74<the voltage GS75 the voltage GS74<the voltage GS76 the voltage GS86<the voltage GS84, and the voltage GS85<voltage GS84.

At this time, the voltage of the node 78 becomes lower than the voltage of the node 77, since the voltage GS74<the voltage GS75.

Moreover, the voltage of the node 88 becomes higher than the voltage of the node 87, since the voltage GS85<voltage GS84.

In addition, the voltage of the node 78 falls down lower, since the voltage GS86<voltage GS84.

As a result, the electric currents flowing through the second P-channel MOS transistor 72 and the third P-channel MOS transistor 73 in the current mirror configuration are decreased. Also, the voltage of the node 88 goes up higher, since the voltage GS74<voltage GS76.

As a result, the electric currents flowing through the sixth P-channel MOS transistor 83 and the fourth N-channel MOS transistor 84 in the current mirror configuration are increased. In this case, the voltage change of the node 78 results from amplification of the voltage changes of voltages GS75 and GS86. Similarly, the voltage change of the node 88 results from amplification of the voltage changes of the voltages GS76 and GS85. Therefore, if the voltages of GS75 to GS85 are higher than a predetermined voltage, the voltages of the nodes 78 and 88 can be changed almost in full range between the power supply potential and the GND potential.

The receiver circuit 31 in the second embodiment amplifies two voltage changes of the voltage GS75 and the voltage GS86, or the voltage GS76 and the voltage GS85. Therefore, the voltage amplification factor is larger than the receiver circuit 30 in the first embodiment. For instance, it is supposed that the electric current I flows through the terminating resistance 12 with the amplitude voltage of 50 mV, the voltage GS75–the voltage GS74=the voltage GS86–the voltage GS84=50 mV, and the voltage GS76–the voltage GS74=the voltage GS85–the voltage GS84=50 mV.

The receiver circuit 31 in the second embodiment has the same effect as the receiver circuit 30 in the first embodiment. For instance, it is supposed that the resistance from the second output transistor 24 in the above-mentioned transmitter circuit 20 to the second input terminal 9 is 100Ω, and the resistance from the first output transistor 23 to the first input terminal 8 is 100Ω. When the second output transistor 24 is turned on, and the first output transistor 23 is turned off, the voltage of the node 15 becomes a floating value from the ground potential. More specifically, if the current flowing from the second input terminal 9 to the second output transistor 24 is 1 mA, the voltage of the node 15 becomes the value of 100 mV (=100Ω*1 mA) floating from ground potential. At this time, the node 14 and the node 15 are terminated by the terminating resistance 12 (=100Ω). Therefore, supposing that the electric current flowing from the node 14 to the node 15 through the terminating resistance 12 is 0.5 mA, the voltage of the node 15 becomes 150 mV (=100Ω*0.5 mA+100 mV). Similarly, when the first output transistor 23 is turned on and the second output transistor 24 is turned off, the current value flowing from the second input terminal 9 to the second output transistor 24 is 0.5 mA. Therefore, the voltage of the node 15 becomes the value of 100 mV (=100Ω*1 mA) from the ground potential. Thus, the amplitude voltage of the node 15 becomes 50 mV (=100 mV−50 mV). This value is determined based on the resistance of the terminating resistance 12 and the current value I that flows through the terminating resistance 12.

It should be noted that the above-mentioned description has been made on the assumption that the sizes of the first P-channel MOS transistor 71, the second P-channel MOS transistor 72, and the third P-channel MOS transistor 73 in the first receiver circuit 70 are equal to each other. However, the size ratio of the first P-channel MOS transistor 71, the second P-channel MOS transistor 72, and the third P-channel MOS transistor 73 is possible to be m:n:1 (m and n satisfy the m>n≧1). Similarly, the size ratio of the fourth P-channel MOS transistor 81, the fifth P-channel MOS transistor 82, and the sixth P-channel MOS transistor 83 is possible to be m:n:1. When the size ratio of the first P-channel MOS transistor 71, the second P-channel MOS transistor 72, and the third P-channel MOS transistor 73 is m:n:1, it is effective to set the size ratio of the first N-channel MOS transistor 74, the second N-channel MOS transistor 75, and the third N-channel MOS transistor 76 to m:n:1. Similarly, when the size ratio of the P-channel MOS transistor 81, the fifth P-channel MOS transistor 82, and the fifth P-channel MOS transistor 83 is m:n:1, it is effective to set the size ratio of the forth N-channel MOS transistor 84, the fifth N-channel MOS transistor 85, and the sixth N-channel MOS transistor 86 to m:n:1.

In the above-mentioned receiver circuit 31 shown in FIG. 14, when the node 14 becomes the floating voltage, and the node 15 becomes the ground potential, the electric current I flows from the node 14 to the node 15 through the terminating resistance 12, and the amplitude voltages of the nodes 14 and 15 are secured. At this time, the electric current flowing from the second P-channel MOS transistor 72 and the Fourth P-channel MOS transistor 81 to the node 15 is necessary for the voltage change of the node 78. Moreover, the electric current flowing from the third P-channel MOS transistor 73 and the fifth P-channel MOS transistor 82 to the node 15 is necessary for the voltage change of the node 88. That is to say, the electric current is not used for the voltage change of the transmission line with a large load capacity. Since the node 78 and the node 88 do not have so large load as the transmission line, the circuit can operate appropriately even if the electric currents of the second P-channel MOS transistor 72, the fourth P-channel MOS transistor 81, and the third P-channel MOS transistor 73 and the fifth P-channel MOS transistor 82 are reduced. In this case, by setting the size ratio of the P-channel MOS transistor 71 and the second P-channel MOS transistor 72, the third P-channel MOS transistor 73 to m:n:1 in the current mirror configuration of the receiver circuit 31 shown in FIG. 14, and by setting the size ratio of the fourth P-channel MOS transistor 81, the fifth P-channel MOS transistor 82, and the sixth P-channel MOS transistor 83 to m:n:1, the electric current flowing to the node 78, the second P-channel MOS transistor 72, and the third P-channel MOS transistor 73 can be decreased. Also, the power consumption of the receiver circuit 31 can be decreased.

Third Embodiment

Figure 15:
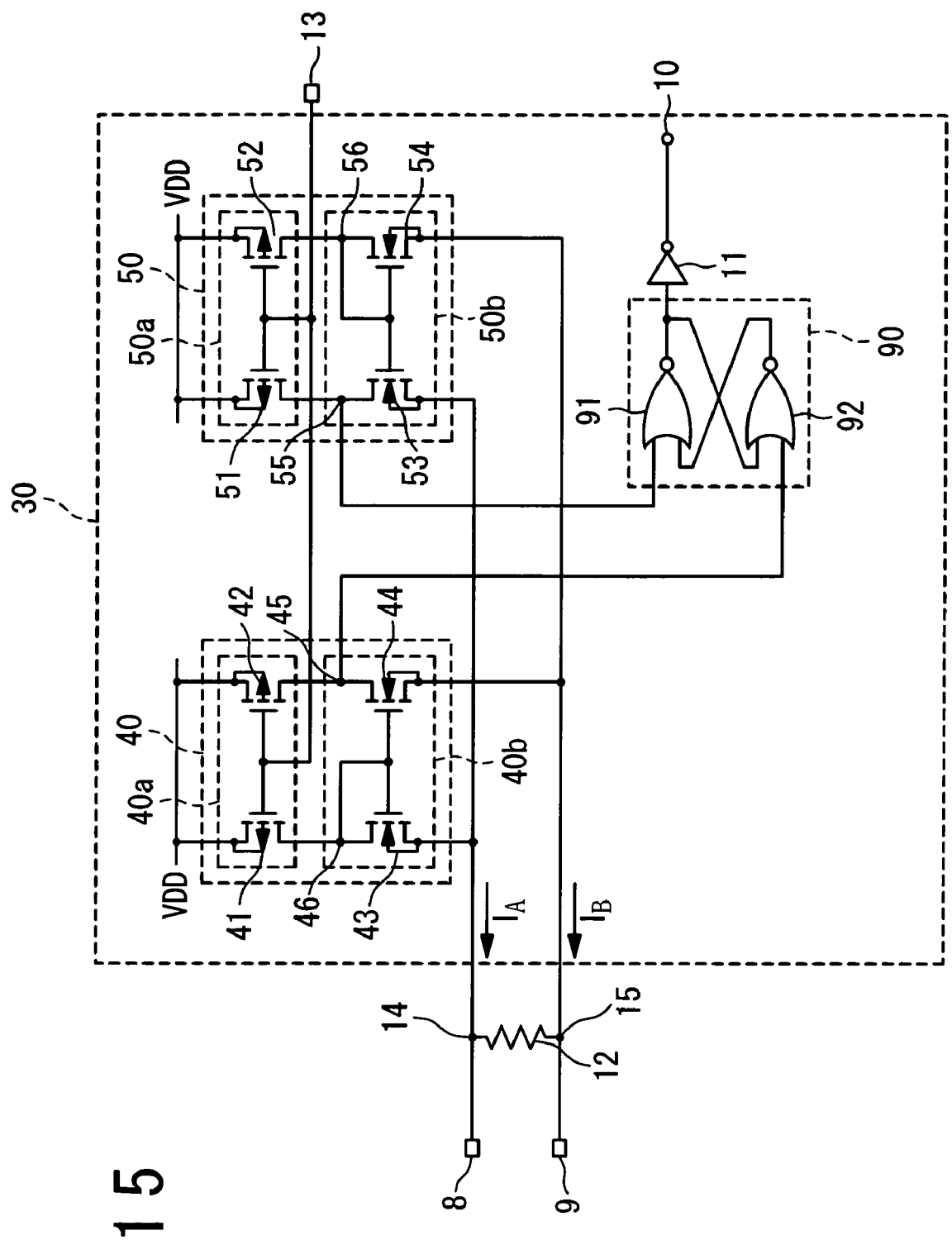
FIG. 15 is a circuit diagram showing a configuration of the receiving unit according to a third embodiment of the present invention.

FIG. 15 is a circuit diagram showing a configuration of the receiving unit 3 according to the third embodiment of the present invention. As shown in FIG. 15, the receiving unit 3 in the third embodiment has a partial deference in the configuration of the receiver circuit 30 from the receiving unit 3 in the first embodiment. Specifically, in the third embodiment, the receiver circuit 30 includes a flip-flop 90 in place of the flip-flop 60. In addition, the flip-flop 90 has a first NOR circuit 91 and a second NOR circuit 92. The first NOR circuit 91 and the second NOR circuit 92 are connected so as to configure a latch circuit. It is obvious to a person skilled in the art that the receiver circuit 30 in the third embodiment having the flip-flop 90 operates equivalently to the receiver circuit 30 in the first embodiment.

Fourth Embodiment

Figure 16:
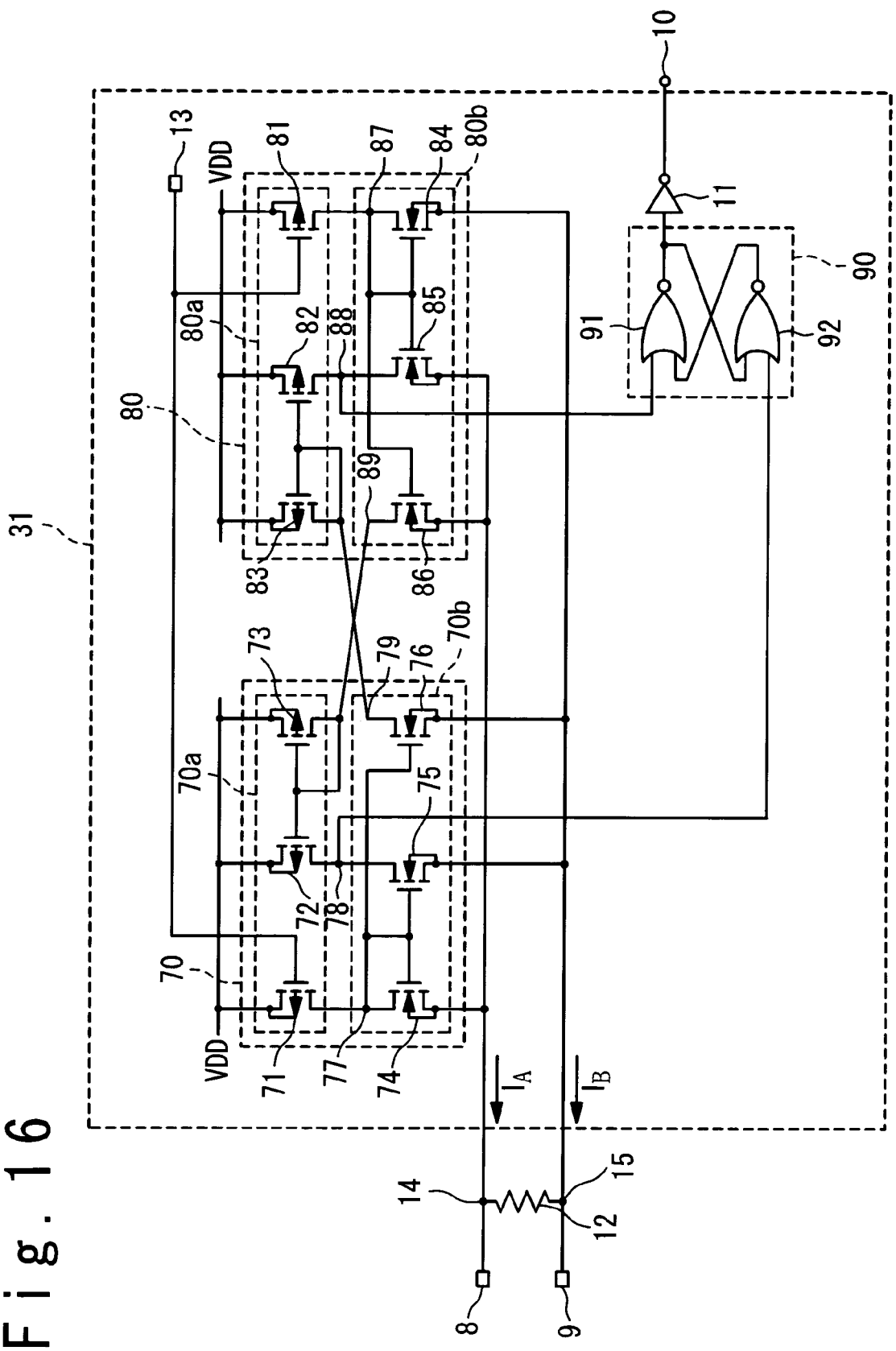
FIG. 16 is a circuit diagram showing a configuration of the receiving unit according to a forth embodiment of the present invention.

FIG. 16 is a circuit diagram showing a configuration of the receiving unit 3 according to the forth embodiment of the present invention. As shown in FIG. 16, the receiving unit 3 in the forth embodiment has a partial deference in the configuration of the receiver circuit 31 from the receiving unit 3 in the second embodiment. Specifically, in the forth embodiment, the receiver circuit 31 includes a flip-flop 90 in place of the flip-flop 60. In addition, the flip-flop 90 has a first NOR circuit 91 and a second NOR circuit 92. The first NOR circuit 91 and the second NOR circuit 92 are connected so as to configure a latch circuit. It is obvious to a person skilled in the art that the receiver circuit 31 in the forth embodiment having the flip-flop 90 operates equivalently to the receiver circuit 31 in the second embodiment.

Fifth Embodiment

Figure 17:
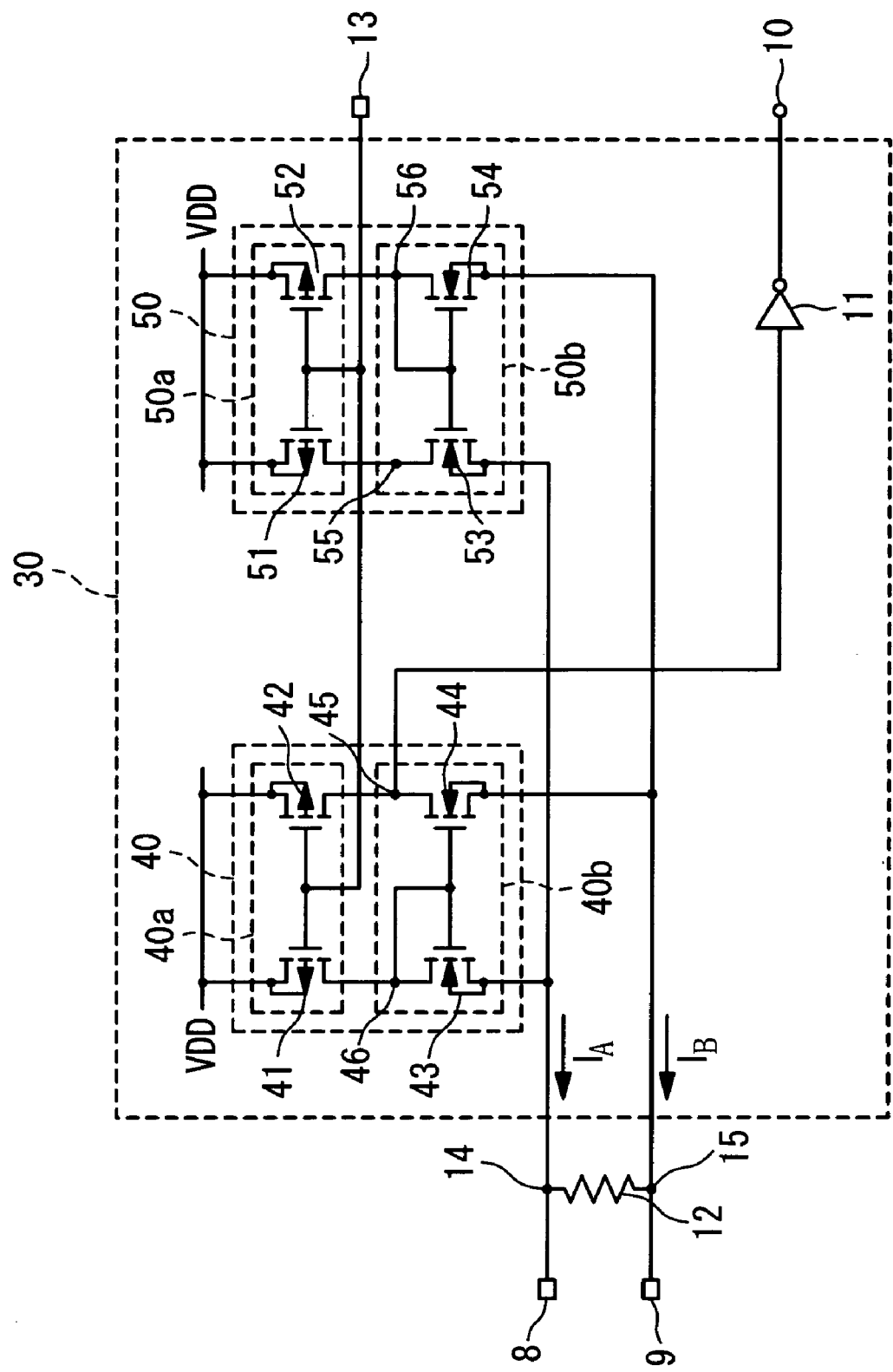
FIG. 17 is a circuit diagram showing a configuration of the receiving unit 3 according to the fifth embodiment of the present invention.

FIG. 17 is a circuit diagram showing a configuration of the receiving unit 3 according to the fifth embodiment of the present invention. As shown in FIG. 17, the receiving unit 3 in the fifth embodiment is deferent from the receiving unit 3 in the first embodiment in that an input of an inverter 11 is connected directly with the node 45. The receiver circuit 30 in the fifth embodiment does not have the flip-flop 60. Certainly, the use of the flip-flop 60 is preferable for the improvement of the reliability of the operation. However, as mentioned above, the voltage of the node 45 of the receiver circuit 30 changes almost fully between the ground potential and the power supply potential. Therefore, there is no problem in the operation even if the input of the inverter 11 is directly connected to the node 45. It is rather preferable for the high-speed operation that the flip-flop 60 is not used. The input of the inverter 11 may be connected with not the node 45 but the node 55. It would be obvious to a person skilled in the art that configuration with no flip-flop 60 is applicable to the receiver circuit 31.

Sixth Embodiment

Figure 18:
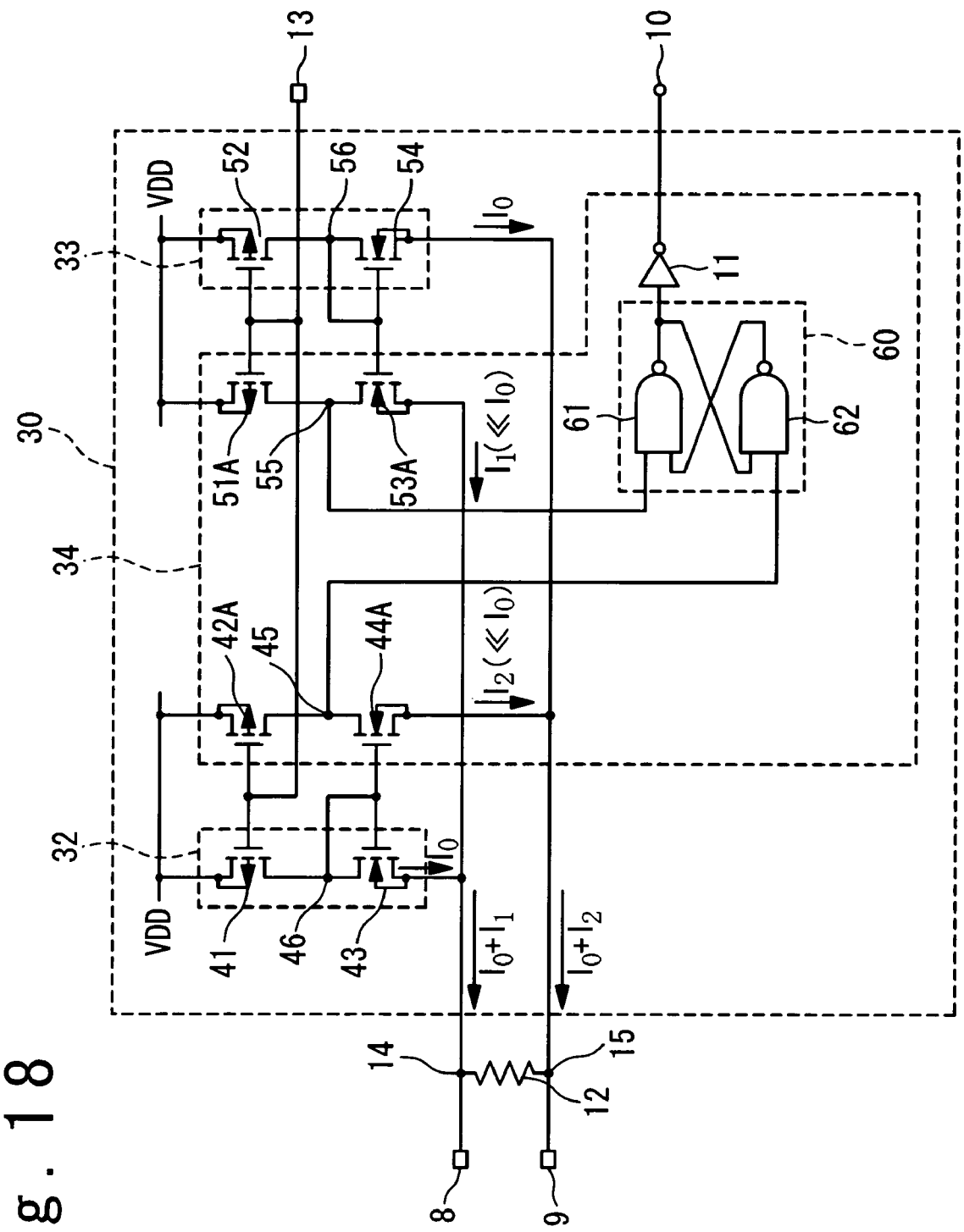
FIG. 18 is a circuit diagram showing a configuration of the receiving unit according to a sixth embodiment of the present invention.

FIG. 18 is a circuit diagram showing a configuration of the receiving unit 3 according to the sixth embodiment of the present invention. As shown in FIG. 18, the receiving unit 3 in the sixth embodiment has a receiver circuit 30 corresponding to the configuration shown in FIG. 6. That is, the receiver circuit 30 in the six embodiment includes constant current sources 32 and 33 to supply constant electric current I0 to the nodes 14 and 15 respectively, and includes a data detecting circuit 34 to determine transmission data from the voltage applied to the terminating resistance 12 (that is, the voltage difference between the node 14 and the node 15). The data detecting circuit 34 supplies to the nodes 14 and 15, respectively, small electric currents I1 and I2 to an extent to be negligible compared with the current electric current I0.

A specific configuration of the receiver circuit 30 in the sixth embodiment is the same as the receiver circuit 30 in the first embodiment shown in FIG. 12 from the viewpoint of the connection of the elements in the circuit. More specifically, the constant current source 32 is composed of a first P-channel MOS transistor 41 and a first N-channel MOS transistor 43. The constant current source 33 is composed of a fourth P-channel MOS transistor 52 and a fourth P-channel MOS transistor 54. The dimensions of the first P-channel MOS transistor 41 and the fourth P-channel MOS transistor 52 are selected so that their drive abilities become identical to each other. The dimensions of the first N-channel MOS transistor 43 and the fourth N-channel MOS transistor 54 are selected so that their drive abilities become identical to each other. The constant current sources 32 and 33 supply the same electric current I0 corresponding to the bias supplied from the bias supply terminal 13 to the nodes 14 and 15, respectively. The data detecting circuit 34 includes a second P-channel MOS transistor 42A, a second N-channel MOS transistor 44A, a third P-channel MOS transistor 51A, a third P-channel MOS transistor 53A, the flip-flop 60, and the inverter 11. The second P-channel MOS transistor 42A and the second N-channel MOS transistor 44A, the third P-channel MOS transistor 51A and the third P-channel MOS transistor 53A respectively correspond to the second P-channel MOS transistor 42 and the second N-channel MOS transistor 44, the third P-channel MOS transistor 51 and the third P-channel MOS transistor 53 in the receiver circuit 30 of the first embodiment, and they are referred to with similar references.

The difference between the sixth embodiment and the first embodiment is in that the gate widths of the second P-channel MOS transistor 42A, the second N-channel MOS transistor 44A, the third P-channel MOS transistor 51A, and the third P-channel MOS transistor 53A, i.e., the drive abilities of these MOS transistors are extremely small compared with the corresponding MOS transistors in the receiver circuit 30 of the first embodiment. For instance, the gate widths of the second P-channel MOS transistor 42A and the second N-channel MOS transistor 44A are set to ⅟20 of the gate width of each of the first P-channel MOS transistor 41 and the first N-channel MOS transistor 43. The gate widths of the third P-channel MOS transistor 51A and the third N-channel MOS transistor 44A are set to ⅟20 of the gate width of each of the fourth P-channel MOS transistor 52 and the fourth N-channel MOS transistor 54. It is important that the gate widths of the Second P-channel MOS transistor 42A, the second N-channel MOS transistor 44A, the third P-channel MOS transistor 51A, and the third P-channel MOS transistor 53A are made small, in order to extremely reduce the electric current I1 and I2 outputted from the data detecting circuit 34, compared with the constant electric current I0.

An operation of the receiver circuit 30 in the sixth embodiment will be described, in a case where the second input terminal 9 (and, the node 15) are grounded through the second output transistor 24 in the second transmission line 7 and the transmitter circuit 20. In this case, it should be noted that the voltage of the node 14 is higher by R0I0 than the node 15. Here, R0 is the resistance of the terminating resistance 12.

Both of the first N-channel MOS transistor 43 and the fourth N-channel MOS transistor 54 are diode-connected. Therefore, the voltage of the gates, that is, the voltages of the nodes 46 and 56, are same and kept constant. When the node 15 is pulled-down to the ground potential, the voltage between the gate and source in the second N-channel MOS transistor 44A, i.e., the voltage GS44 increases. Therefore, the voltage of the node 45 connected with the drain of the second N-channel MOS transistor 44A is lowered compared to the voltage of the node 46.

On the other hand, the voltage of the node 14 is pulled-up to the potential R0I0. Therefore, the voltage between gate and source of the fourth N-channel MOS transistor 54A, i.e., the voltage GS54 decreases, so that the voltage of the node 55 connected with the drain of the forth-N channel MOS transistor 54A becomes higher than the voltage of the node 56. The voltage change of the node 45 results form amplification of the voltage change of the voltage GS44. Similarly, the voltage change of the node 55 results from amplification of the voltage change of the voltage GS53. Therefore, if the voltages of the GS44 and GS53 are higher than a predetermined voltage, the voltages of the node 45 and the node 55 change almost in a full range between the power supply potential and the ground potential. The voltage change of the nodes 45 and 55 correspond to the transmission data from the transmitter circuit 20. The voltage changes of the nodes 45 and 55 are latched by the flip-flop circuit 60, and outputted as reception data from the output terminal 10. It would be obvious to a person skilled in the art that a similar operation is carried out when the first input terminal 8 (and the node 14) is grounded through the first output transistor 23 of the transmitter circuit 20 and the first transmission line 6.

The advantage of the receiver circuit 30 in the sixth embodiment is in that power consumption can be reduced, compared with the receiver circuit 30 in the first embodiment. Certainly, in order to enlarge the voltage changes of the nodes 14 and 15 enough, it is necessary to supply the constant electric current I0 large to an extent. This point is similar to the receiver circuit 30 in the first embodiment. However, in the receiver circuit 30 in the sixth embodiment, the electric currents I1 and I2 flowing to the second P-channel MOS transistor 42A, the second N-channel MOS transistor 44A, the third P-channel MOS transistor 51A, and the third P-channel MOS transistor 53A are restricted. Therefore, it is advantageous to reduce power consumption.

Seventh Embodiment

Figure 19:
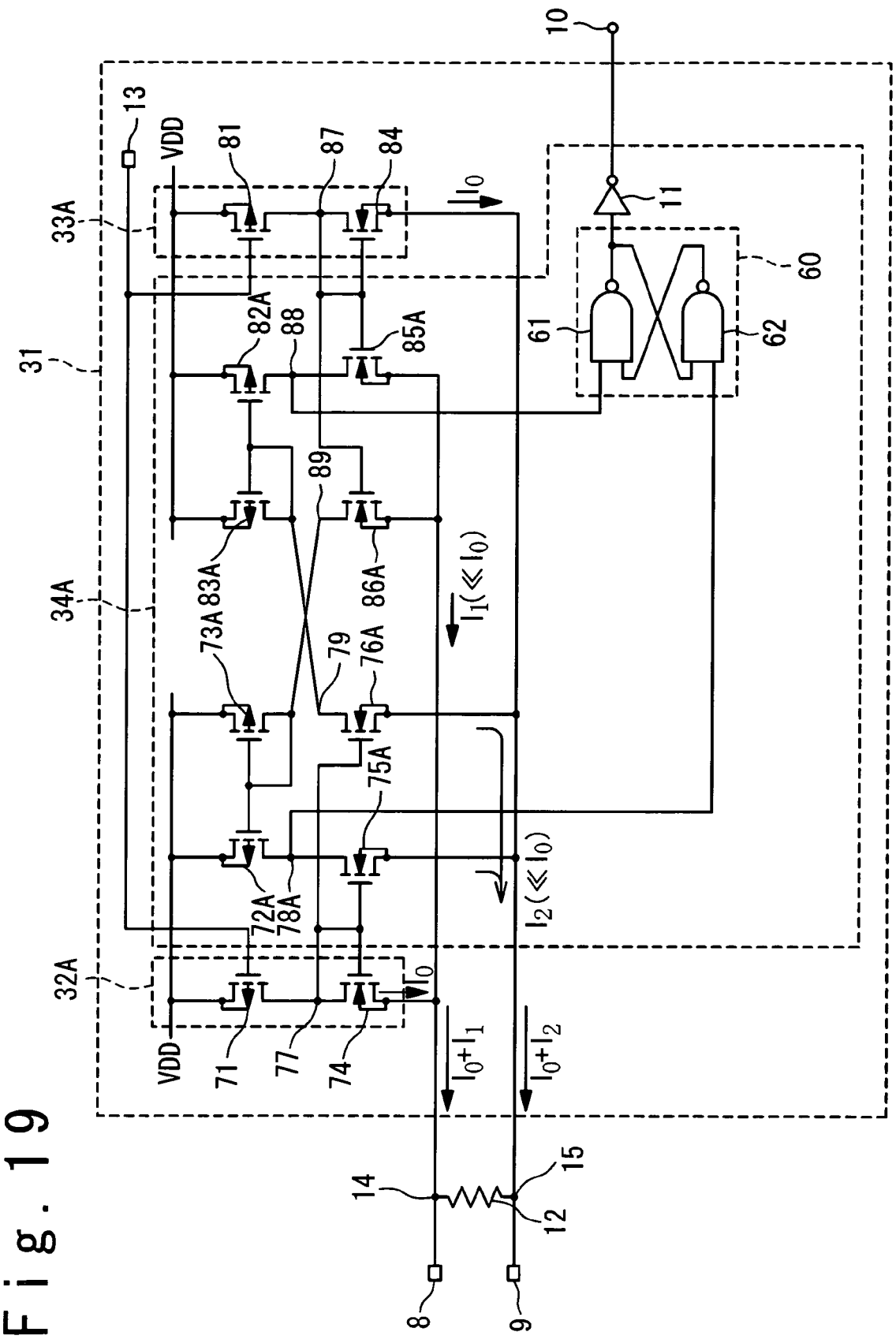
FIG. 19 is a circuit diagram showing a configuration of the receiving unit according to the seventh embodiment of the present invention.

FIG. 19 is a circuit diagram showing a configuration of the receiving unit 3 according to the seventh embodiment of the present invention. The receiving unit 3 in the seventh embodiment has the receiver circuit 30 corresponding to the configuration shown in FIG. 6 as well as the sixth embodiment. That is, the receiver circuit 30 in the seventh embodiment includes constant current sources 32A and 33A to supply constant electric current I0 to the nodes 14 and 15, respectively, and includes a data detecting circuit 34A to determine transmission data from the voltage applied to the terminating resistance 12, that is, the voltage difference between the node 14 and the node 15. The data detecting circuit 34A supplies to the nodes 14 and 15, electric currents I1 and I2 that are small to an extent to be negligible compared with the current electric current I0, respectively.

A concrete configuration of the receiver circuit 30 in the seventh embodiment is the same as the receiver circuit 30 in the second embodiment shown in FIG. 14 from the viewpoint of the connection of the elements configuring the circuit. More specifically, the constant current source 32A is composed of a first P-channel MOS transistor 71 and a first N-channel MOS transistor 74. The constant current source 33A is composed of a fourth P-channel MOS transistor 81 and a fourth P-channel MOS transistor 84. Dimensions of the first P-channel MOS transistor 71 and the fourth P-channel MOS transistor 81 are selected so that their drive abilities become identical to each other. Also, dimensions of the first N-channel MOS transistor 74 and the fourth N-channel MOS transistor 84 are selected so that their drive abilities become identical to each other. The constant current sources 32 and 33 supply the same electric current I0 corresponding to a bias supplied from the bias supply terminal 13 to the nodes 14 and 15, respectively.

The data detecting circuit 34A includes second and third P-channel MOS transistors 72A and 73A, fifth and sixth P-channel MOS transistors 82A and 83A, second and third N channel MOS transistors 75A and 76A, fifth and sixth N-channel MOS transistors 85A and 86A, a flip-flop 60, and an inverter 11. The second and third P-channel MOS transistors 72A and 73A, the fifth and sixth P-channel MOS transistors 82A and 83A, the second and third N channel MOS transistors 75A and 76A, the fifth and sixth N-channel MOS transistors 85A and 86A respectively correspond to the second and third P-channel MOS transistors 72 and 73, the fifth and sixth P-channel MOS transistors 82 and 83, the second and third N channel MOS transistors 75 and 76, the fifth and sixth N-channel MOS transistors 85 and 86 in the receiver circuit 31 in the second embodiment, and they are referred to with similar references.

The difference of the seventh embodiment from the second embodiment is in that the gate widths of the second and third P-channel MOS transistors 72A and 73A, the fifth and sixth P-channel MOS transistors 82A and 83A, the second and third N channel MOS transistors 75A and 76A, the fifth and sixth N-channel MOS transistors 85A and 86A, i.e., the drive abilities of these MOS transistors are extremely small, compared with the corresponding MOS transistors in the receiver circuit 31 of the second embodiment. It is important that the gate widths of the MOS transistors of the second and third P-channel MOS transistors 72A and 73A, the fifth and sixth P-channel MOS transistors 82A and 83A, the second and third N channel MOS transistors 75A and 76A, the fifth and sixth N-channel MOS transistors 85A and 86A are small, in order to extremely reduce the electric current I1 and I2 outputted from the data detecting circuit 34A compared with the constant electric current I0.

The operation of the receiver circuit 31 in the seventh embodiment will be described, in a case that the second input terminal 9 (and, the node 15) are grounded through the second output transistor 24 in the transmitter circuit 20 and the second transmission line 7. In this case, it should be noted that the voltage of the node 14 is higher by R0I0 than the node 15. Here, R0 is the resistance of the terminating resistance 12. Both of the first N-channel MOS transistor 74 and the fourth N-channel MOS transistor 84 are diode-connected, so that the voltages of the gates of these transistors (that is, the voltages of the nodes 77 and 87) are same and kept constant.

When the node 15 is pulled-down to the ground potential, the voltage between the gate and source of the second N-channel MOS transistor 75A (the voltage GS75) increases. Therefore, the voltage of the node 78 connected with the drain of the second N-channel MOS transistor 44A is lowered compared to the potential of the node 77. On the other hand, since the voltage of the node 14 is pulled-up to the potential R0I0, the voltage between the gate and source of the fifth N-channel MOS transistor 85A (the voltage GS85) decreases. Therefore, the voltage of the node 88 connected with the drain of the fifth N channel MOS transistor 85A becomes higher than the potential of the node 87.

When the potential of the node 14 is pulled-up, the voltage between the gate and source of the sixth N-channel MOS transistor 86A (the voltage GS86) decreases. Therefore, the voltage of the node 89 connected with the drain of the sixth N channel MOS transistor 86A becomes higher. When the potential of the node 89 becomes higher, the electric current flowing to the second and third P-channel MOS transistors 72A and 73A decrease, so that the voltage of the node 78 falls further.

Similarly, when the voltage of the node 15 is pulled-down, the voltage between the gate and source of the third N-channel MOS transistor 76A (the voltage GS76) increases. Therefore, the voltage of the node 79 connected with the drain of the third N-channel MOS transistor 76A becomes lower. When the potential of the node 79 becomes lower, the electric current flowing to the fifth and sixth P-channel MOS transistors 82A and 83A increase, so that the potential of the node 88 rises higher.

In this way, the voltage change of the node 78 results from amplification of the voltage change of the voltage GS86. Similarly, the voltage change of the node 88 results from amplification of the voltage changes of the voltage GS76 and GS85. Therefore, if the voltages GS86, GS76 and GS85 are changed to an extent, the voltages of the node 78 and the node 88 change almost in a full range between the power supply potential and the ground potential. The changes of the voltages of the nodes 78 and 88 correspond to the data transmitted from the transmitter circuit 20. The changes of the voltages of the nodes 78 and 88 are latched by the flip-flop 60, and then outputted from the output terminal 10 as a reception data.

The advantage of the receiving unit 3 in the seventh embodiment is in that the voltage amplification factor is large, compared with the sixth embodiment. In the seventh embodiment, the voltage change of the node 78 is caused through the change of the two voltages GS75 and GS86. Also, the voltage change of the node 88 is caused through the change of the two voltages GS76 and GS85. Therefore, the receiving unit 3 in the seventh embodiment can achieve the large voltage amplification factor.

Eighth Embodiment

Figure 20:
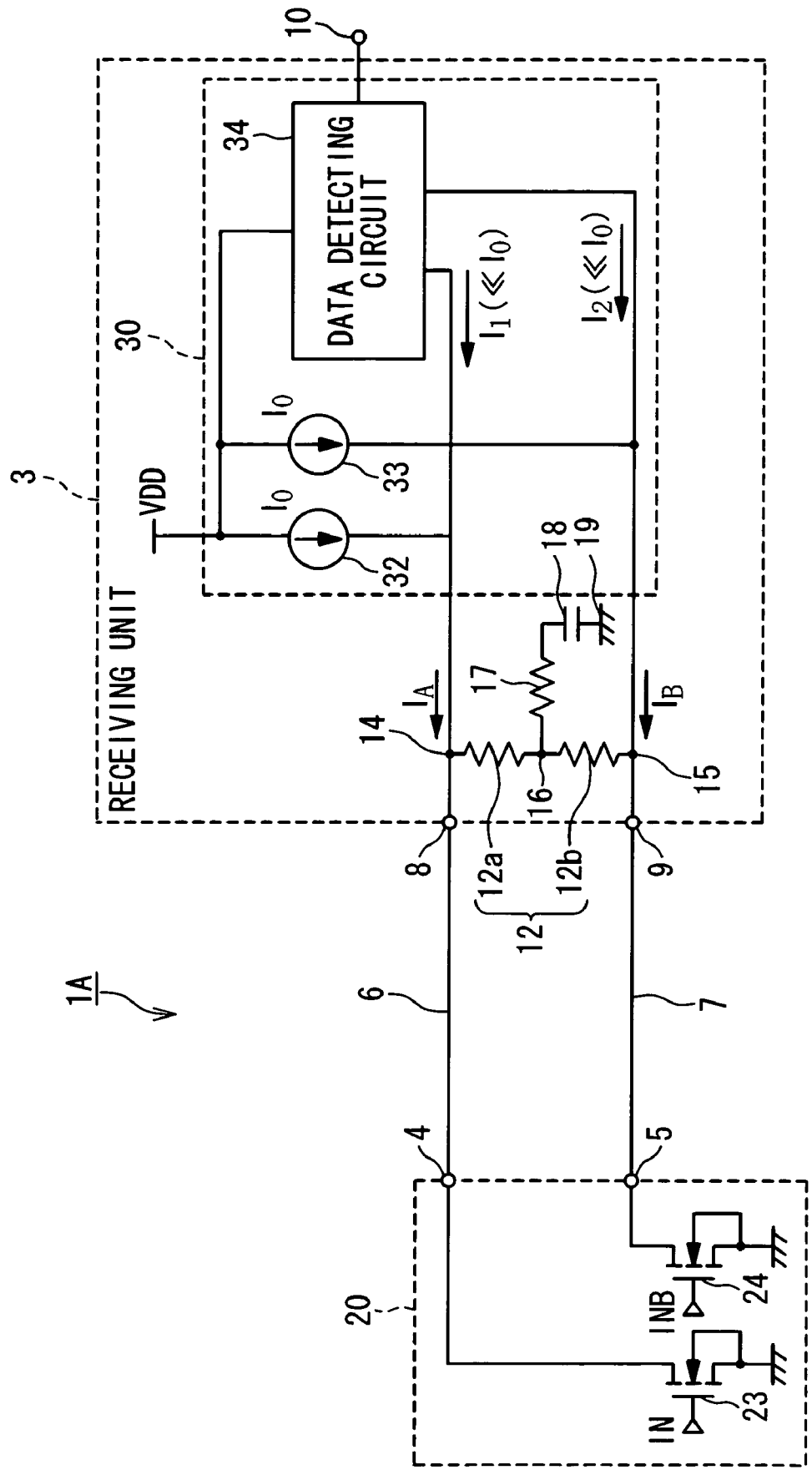
FIG. 20 is a circuit diagram showing a configuration of the data transmission apparatus according to an eighth embodiment of the present invention.

FIG. 20 is a circuit diagram showing a configuration of the data transmission apparatus 1A according to the eighth embodiment of the present invention. In the data transmission apparatus 1A shown in FIG. 20, the configuration of the receiving unit 3 is modified as follows. That is, the terminating resistance 12 in the receiving unit 3 is composed of two resistance elements 12a and 12b connected in series, and additionally, a series connection of a resistance element 17 and a capacitive element 18 connected between a connection node 16 between the resistance elements 12a and 12b and the ground potential 19.

Such a configuration is effective to decrease noise of the signal transmitted on the first transmission line 6 and the second transmission line 7. This is because the resistance element 17 and the capacitive element 18 function as a route to discharge a high frequency component of a common noise into the ground potential 19. Even if the common noise with the high frequency component is superimposed on the signal transmitted through the first transmission line 6 and the second transmission line 7, the noise can be removed by the resistance element 17 and the capacitive element 18.

In the configuration shown in FIG. 20, it is desirable that a sum of the resistances of the resistance elements 12a and 12b is equal to a differential impedance Zdiff in the transmission line of the first transmission line 6 and the second transmission line 7. As mentioned above, it is effective to restrict the reflection of the voltage wave and the current wave in the receiver circuit 30 and to decrease the noise of the signal transmitted through the transmission line that the sum of the resistances of the resistance elements 12a and 12b is equal to the differential impedance Zdiff.

Ninth Embodiment

Figure 21:
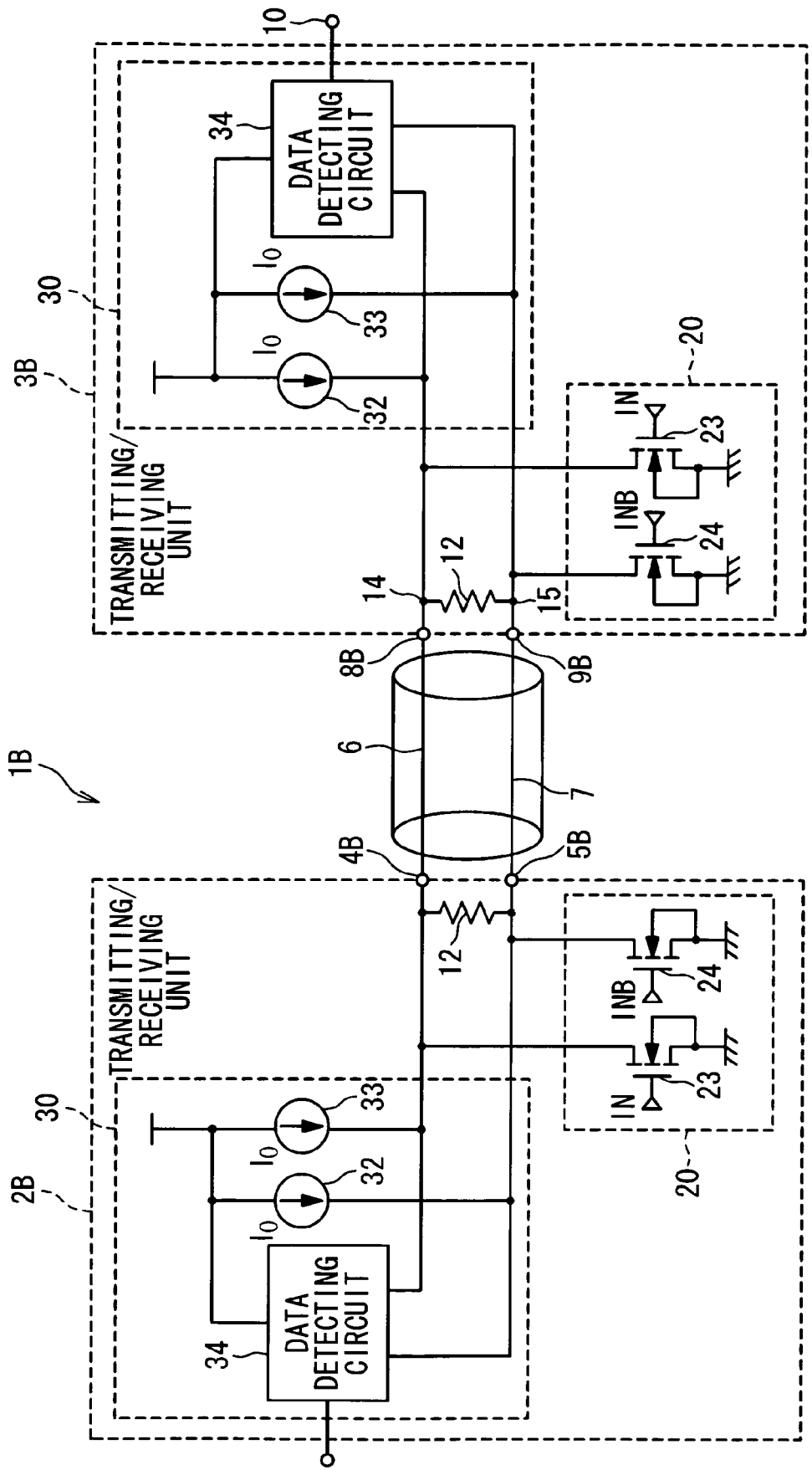
FIG. 21 is a circuit diagram showing a configuration of the data transmission apparatus according to a ninth embodiment of the present invention.

FIG. 21 is a circuit diagram showing a configuration of the data transmission apparatus 1B according to the ninth embodiment of the present invention. The data transmission apparatus 1B shown in FIG. 21 has a configuration to carry out bi-directional communication between a transmitting/receiving units 2B and 3B. More specifically, both of the transmitting/receiving units 2B and 3B includes the transmitter circuit 20 and the receiver circuit 30 which have the configurations mentioned above. The transmitter circuit 20 and the receiver circuit 30 in the transmitting/receiving unit 2B are connected with input/output terminals 4B and 5B. The transmitter circuit 20 and the receiver circuit 30 in the transmitting/receiving unit 3B are connected with input/output terminals 8B and 9B. A terminating resistance 12 is connected between the input/output terminals 4B and 5B in the transmitting/receiving unit 2B, and another terminating resistance 12 is connected between the input/output terminals 8B and 9B in the transmitting/receiving unit 3B. It would be obvious to a person skilled in the art that the data transmission apparatus 1B having such a configuration can achieve the bi-directional communication.

Tenth Embodiment

FIG. 22 is a circuit diagram showing a configuration of the data transmission apparatus 1C according to the tenth embodiment of the present invention. In the data transmission apparatus 1C shown in FIG. 22, the P-channel MOS transistor is used not the N-channel MOS transistor as an output transistor of the transmitter circuit. Therefore, the configuration and the operation of the receiver circuit are modified.

More specifically, the data transmission apparatus 1C shown in FIG. 22 is composed of a transmitting unit 2C and a receiving unit 3C. The transmitting unit 2C includes a transmitter circuit 20C, a first output terminal 4, and a second output terminal 5. The transmitter circuit 20C includes a data input terminal 25, a first inverter 21, a second inverter 22, a first output transistor 23C, and a second output transistor 24C. The data input terminal 25 receives a transmission data signal /DIN corresponding to a transmission data. The first inverter 21 inverts the transmission data signal /DIN supplied from the data input terminal 25 to generate a signal IN. The second inverter 22 inverts the signal IN and generates a signal INB. The signal IN and signal INB are a set of complementary signals corresponding to the transmission data. The first output transistor 23C the and second output transistor 24C are P-channel MOS transistors whose sources are connected with the power supply line VDD. The first output transistor 23 functions as a switching element to electrically connect the first output terminal 4 with the power supply line VDD in response to the signal IN. The second output transistor 24C functions as a switching element to connect the second output terminal 5 to electrically connect the power supply line VDD in response to the signal INB. The first output transistor 23C and the second output transistor 24 C are turned on exclusively in response to the signal IN and the signal INB. The states of the first output transistor 23C and the second output transistor 24C are determined based on the transmission data.

The receiving unit 3C includes the terminating resistance 12, a receiver circuit 30C, a first input terminal 8, and a second input terminal 9. The terminating resistance 12 is provided between the node 14 connected with the first input terminal 8 and the node 15 connected with the second input terminal 9. The receiver circuit 30C generates a reception data. The receiver circuit 30C has two functions. One of the functions is to draw out electric currents IA and IB used to transmit and receive data from the nodes 14 and 15, respectively. The route through which the electric currents IA and IB flow is determined based on which of the transistors of the transmitter circuit 20C is turned on, that is, depending on whether either the first output transistor 23C or the second output transistor 24 C is turned on. As shown in FIG. 22, when the first output transistor 23C is turned on, and the second output transistor 24C is turned off, an electric current IA+IB obtained by adding the electric currents IA and IB is supplied from the first output transistor 23C to the node 14 through the first transmission line 6. Of the electric current supplied to the node 14, the electric current IA flows directly into the receiver circuit 30 from the node 14, and the electric current IB flows to the node 15 from the node 14 through the terminating resistance 12, and flows into the receiver circuit 30C. On the other hand, when the first output transistor 23C is turned off, and the second output transistor 24C turned on, the electric current IA+IB is supplied to the node 15 from the second output transistor 24C through the second transmission line 7. Of the electric current supplied to the node 15, the electric current IB flows directly into the receiver circuit 30C from the node 15, and the electric current IA flows to the node 14 from the node 15 through the terminating resistance 12, and then flows into the receiver circuit 30C.

The other function of the receiver circuit 30C is to determine the data sent from the transmitting unit 2C based on the voltage generated across the terminating resistance 12, that is, the voltage difference between the node 14 and 15. As mentioned above, the electric current flows through the terminating resistance 12 in the different directions, depending on whether either of the first output transistor 23C or the second output transistor 24C is turned on, that is, depending on the data to be transmitted. Therefore, the node 14 and the node 15 connected by the terminating resistance 12 have the voltage difference corresponding to the data to be transmitted. The receiver circuit 30C determines the data transmitted based on this voltage difference, and outputs the determined data as a reception data.

The data transmission apparatus 1C having such a configuration is different from the data transmission apparatus 1 shown in FIG. 3 in the electric current flowing direction. However, the same advantage can be attained in the data transmission apparatus 1C as well as the data transmission apparatus 1 shown in FIG. 3. Specifically, the voltage used to determine the data by the receiver circuit 30C, that is, the voltage generated across the terminating resistance 12 is determined based on the resistance R0 of the terminating resistance 12 and the electric current I flowing through the terminating resistance 12. On the other hand, the amplitude of the voltage signal generated across the terminating resistance 12 does not depend on the ON resistances of the first output transistor 23C and the second output transistor 24C, the impedance of the first transmission line 6 and the second transmission line 7. This contributes the restraint of the change of power consumption and the improvement of the stability of data transmission at high speed, as mentioned above.

In order to stabilize the amplitude of the voltage signal generated across the terminating resistance 12, it is preferable that the electric current IB flowing to the receiver circuit 30C from the node 15 when the node 15 is disconnected from the power supply line VDD by the second transistor 24 being turned off is the same as the electric current IA flowing to the receiver circuit 30C from the node 14 when the node 14 is disconnected from the power supply line VDD by the first output transistor 23 being turned off. In such a configuration, regardless of which of the first output transistor 23C or the second output transistor 24C is turned on, the amplitude of the voltage signal generated across the terminating resistance 12 becomes constant to R0IA (=R0IB). This is preferable to transmit the data at high speed.

Eleventh Embodiment

FIG. 23 is a circuit diagram showing a configuration of the receiver circuit 30C according to the eleventh embodiment of the present invention. In the eleventh embodiment, the receiver circuit 30C includes a constant current source 32C, a constant current source 33C, and a data detecting circuit 34C. The constant current sources 32C and 33 C draw out the constant electric current I0 from the nodes 14 and 15 to flow out to the ground potential. The data detecting circuit 34 determines the transmission data in response to the voltage generated across the terminating resistance 12, that is, the voltage difference between the node 14 and the node 15, and outputs the determined data as a reception data.

The electric currents I1 and I2 drawn out respectively from the nodes 14 and 15 by the data detecting circuit 34C are reduced to a negligible extent, compared with the constant electric current I0 drawn out from the nodes 14 and 15 by the constant current sources 32C and 33C. As a result, the magnitude of electric current I flowing through the terminating resistance 12 is approximately equal to the constant current I0 regardless of which of the first output transistor 23C or the second output transistor 24C is turned on. Therefore, the amplitude of the voltage signal generated across the terminating resistance 12 becomes constant to approximately R0I0. It is advantageous for the data transmission at high speed. Ideally, it is desirable that the magnitudes of the electric currents I1 and I2 are set to 0.

Even if the magnitudes of the electric currents I1 and I2 are not 0, it is preferable that the electric current I2 flowing into the data detecting circuit 34C from the node 15 when the node 15 is disconnected from the power supply line VDD by the second transistor 24C being turned off is the same as the electric current I1 flowing into the data detecting circuit 34C from the node 14 when the node 14 is disconnected from the power supply line VDD by the first output transistor 23C being turned off. In such a configuration, regardless of which of the first output transistor 23C or the second output transistor 24C is turned on, the amplitude of the voltage signal generated across the terminating resistance 12 becomes constant to R0I0.

According to the present invention, the amplitude voltage of a transmission line provided between a receiving unit and a transmitter circuit can be stabilized.

Also, according to the present invention, it is possible to stably supply an electric current to a circuit by the receiving unit including a constant current source of a current mirror configuration. In addition, in the present invention, it is possible to reduce power consumption because all electric currents in the receiving unit can be supplied to the transmitter circuit.

What is claimed is:
1. A data transmission apparatus comprising:
a transmitting unit;
a transmission line connected with said transmitting unit and comprising a first transmission line and a second transmission line;
a receiving unit connected with said transmission line; and
a terminating resistance connected between a first reception node connected with said first transmission line on a receiving unit side and a second reception node connected with said second transmission line on a receiving unit side,
wherein said transmitting unit transmits a transmission data to said receiving unit through said transmission line, and
said receiving unit detects a reception data corresponding to said transmission data based on an amplitude voltage as a voltage difference between said first reception node and said second reception node;
wherein said amplitude voltage is independent of an impedance of a component of said transmitting unit,
wherein said transmitting unit comprises:
a first switch connected between said first transmission line and a ground terminal; and
a second switch connected between said second transmission line and said ground terminal, said transmission apparatus exclusively turns on one of said first switch and said second switch in response to said transmission data, and an electric current flows from said receiving unit to the turned-on switch through said transmission line, wherein said receiving unit comprises:

a receiver circuit configured to supply a first electric current to said first reception node and a second electric current to said second reception node, to detect said reception data in response to said amplitude voltage, and to output the detected reception data, wherein said receiver circuit comprises:

a constant current source configured to supply a first constant current to said first reception node and a second constant current to said second reception node; and a data detecting circuit configured to supply a first sub-electric current to said first reception node and a second sub-electric current to said second reception node, and to generate said reception data in response to said amplitude voltage, and said first electric current is a summation of said first constant current and said first sub-electric current and said second electric current is a summation of said second constant current and said second sub-electric current;

wherein said data detecting circuit supplies said first sub-electric current to said first reception node depending on said second constant current and said second sub-electric current to said second reception node depending on said first constant current, and outputs said reception data corresponding to said transmission data in response to said amplitude voltage.

2. The data transmission apparatus according to claim 1, wherein said constant current source comprises:

a first constant current source configured to supply said first constant current to said first reception node based on a bias; and a second constant current source configured to supply said second constant current to said second reception node based on said bias.

3. The data transmission apparatus according to claim 2, wherein said data detecting circuit supplies said first sub-electric current to said first reception node depending on said second constant current and said second sub-electric current to said second reception node depending on said first constant current, and outputs said reception data corresponding to said transmission data in response to said amplitude voltage.

4. A data transmission apparatus comprising:

a transmitting unit;

a transmission line connected with said transmitting unit and comprising a first transmission line and a second transmission line;

a receiving unit connected with said transmission line; and a terminating resistance connected between a first reception node connected with said first transmission line on a receiving unit side and a second reception node connected with said second transmission line on a receiving unit side, wherein said transmitting unit transmits a transmission data to said receiving unit through said transmission line, and said receiving unit detects a reception data corresponding to said transmission data based on an amplitude voltage as a voltage difference between said first reception node and said second reception node;

wherein said amplitude voltage is independent of an impedance of a component of said transmitting unit, wherein said transmitting unit comprises:

a first switch connected between said first transmission line and a power supply terminal; and a second switch connected between said second transmission line and said power supply terminal, said transmission apparatus exclusively turns on one of said first switch and said second switch in response to said transmission data, and an electric current flows from the turned-on switch to said receiving unit through said transmission line, wherein said receiving unit comprises:

a receiver circuit configured to draw out a first electric current from said first reception node and a second electric current from said second reception node, to detect said reception data in response to said amplitude voltage, and to output the detected reception data, wherein said receiver circuit comprises:

a constant current source configured to draw out a first constant current from said first reception node and a second constant current from said second reception node; and a data detecting circuit configured to draw out a first sub-electric current from said first reception node and a second sub-electric current from said second reception node, and to generate said reception data in response to said amplitude voltage, and said first electric current is a summation of said first constant current and said first sub-electric current and said second electric current is a summation of said second constant current and said second sub-electric current.

5. The data transmission apparatus according to claim 4, wherein said constant current source comprises:

a first constant current source configured to draw out said first constant current from said first reception node based on a bias; and a second constant current source configured to draw out said second constant current from said second reception node based on said bias.

6. The data transmission apparatus according to claim 5, wherein said data detecting circuit draws out said first sub-electric current from said first reception node depending on said second constant current and said second sub-electric current from said second reception node depending on said first constant current, and outputs said reception data corresponding to said transmission data in response to said amplitude voltage.

7. The data transmission apparatus according to claim 1, wherein said first sub-electric current and said second sub-electric current are smaller than said first constant current and said second constant current, respectively.

8. The data transmission apparatus according to claim 1, wherein said data detecting circuit comprises:

a first detecting circuit connected with said first transmission line and said second transmission line, and configured to detect said amplitude voltage, and to generate a first output signal based on said amplitude voltage;

a second detecting circuit connected with each of said first transmission line and said second transmission line, and configured to detect said amplitude voltage and to generate a second output signal based on said amplitude voltage; and an output circuit configured to output said reception data in response to at least one of said first and second output signals.

9. The data transmission apparatus according to claim 8, wherein said output circuit comprises a flip-flop circuit.

10. The data transmission apparatus according to claim 2, wherein each of said first and second constant current sources comprises a plurality of P-channel transistors connected with said data detecting circuit, two of said plurality of P-channel transistors have gates connected with each other and connected with said bias, and a size ratio of said first P channel transistor and said second P channel transistor is n:m (n and m are optional natural numbers).

11. The data transmission apparatus according to claim 2, wherein each of said first and second constant current sources comprises a plurality of P-channel transistors connected with said data detecting circuit, two of said plurality of P-channel transistors have gates connected with each other, another of said plurality of P-channel transistors has a gate connected with said bias, and a size ratio of said three P channel transistors is n:m:l (n, m and l are optional natural numbers).

12. A receiving apparatus comprising:

a constant current source configured to supply a first constant current to a first reception node and a second constant current to a second reception node, wherein first and second transmission lines to transmit a transmission data are connected with said first and second reception nodes, respectively;

a terminating resistance connected between the first reception node connected with said first transmission line on the receiving apparatus and the second reception node connected with said second transmission line on the receiving apparatus; and a data detecting circuit configured to supply a first sub-electric current to said first reception node and a second sub-electric current to said second reception node, and to generate a reception data in response to an amplitude voltage, wherein a first electric current is a summation of said first constant current and said first sub-electric current and a second electric current is a summation of said second constant current and said second sub-electric current, said amplitude voltage is generated by supplying said first electric current to said first reception node and said second electric current to said second reception node, wherein said data detecting circuit supplies said first sub-electric current to said first reception mode depending on said second constant current and said second sub-electric current to said second reception node depending on said first constant current, and outputs said reception data corresponding to said transmission data in response to said amplitude voltage.

13. The data transmission apparatus of claim 1, wherein the receiving unit has a current supply capability and the transmitting unit does not have a current supply capability in case of a high level on the transmission line.

14. The data transmission apparatus of claim 4, wherein the receiving unit has a current supply capability and the transmitting unit does not have a current supply capability in case of a high level on the transmission line.

15. The receiving apparatus of claim 12, wherein the receiving apparatus has a current supply capability and a transmitting unit that transmits the transmission data does not have a current supply capability in case of a high level on the transmission line.

16. The data transmission apparatus of claim 1, wherein the terminating resistance stabilizes the voltage of the signal line on a high level side to a predetermined voltage when one side of the differential signal keeps the high level.

17. The data transmission apparatus of claim 4, wherein the terminating resistance stabilizes the voltage of the signal line on a high level side to a predetermined voltage when one side of the differential signal keeps the high level.

18. The receiving apparatus of claim 12, wherein the terminating resistance stabilizes the voltage of the signal line on a high level side to a predetermined voltage when one side of the differential signal keeps the high level.

* * * * *